US012576667B2

(12) United States Patent
Usui et al.

(10) Patent No.: US 12,576,667 B2
(45) Date of Patent: Mar. 17, 2026

(54) DECORATIVE SHEET AND DECORATIVE MEMBER

(71) Applicant: Dai Nippon Printing Co., Ltd., Tokyo (JP)

(72) Inventors: Hironaga Usui, Tokyo (JP); Natsuo Sugita, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 200 days.

(21) Appl. No.: 18/284,611

(22) PCT Filed: Feb. 28, 2022

(86) PCT No.: PCT/JP2022/008312
§ 371 (c)(1),
(2) Date: Sep. 28, 2023

(87) PCT Pub. No.: WO2022/209516
PCT Pub. Date: Oct. 6, 2022

(65) Prior Publication Data
US 2024/0157722 A1 May 16, 2024

(30) Foreign Application Priority Data

Mar. 31, 2021 (JP) ................................. 2021-061749
Feb. 18, 2022 (JP) ................................. 2022-024268

(51) Int. Cl.
*B32B 5/16* (2006.01)
*B44F 7/00* (2006.01)
*E04F 13/08* (2006.01)
(52) U.S. Cl.
CPC .................. *B44F 7/00* (2013.01); *B32B 5/16* (2013.01); *E04F 13/0871* (2013.01)

(58) Field of Classification Search
CPC .... B32B 5/16; B32B 5/30; E04F 13/16; E04F 13/0871
See application file for complete search history.

(56) References Cited

U.S. PATENT DOCUMENTS

2019/0210343 A1 7/2019 Oshima et al.
2019/0248100 A1* 8/2019 Horio ...................... B32B 9/042
(Continued)

FOREIGN PATENT DOCUMENTS

JP 4286949 B2 7/2009
JP 2010-280203 A 12/2010
(Continued)

OTHER PUBLICATIONS

English translation of Written Opinion of the International Searching Authority mailed Mar. 29, 2022, issued for PCT/JP2022/008312.
(Continued)

*Primary Examiner* — Elizabeth E Mulvaney
(74) *Attorney, Agent, or Firm* — Troutman Pepper Locke LLP

(57) ABSTRACT

A decorative sheet includes a substrate, a surface protective layer that covers the substrate, and raised portions situated between the substrate and the surface protective layer. The raised portions face first regions of the surface protective layer. The raised portions include a first binder resin, and first particles of which an average particle size is 10 μm or more. The surface protective layer includes a second binder resin, and second particles of which an average particle size is 10 μm or more and 20 μm or less. An average thickness of the raised portions is 20 μm or more. An average thickness of the surface protective layer is 3 μm or more and 15 μm or less.

20 Claims, 3 Drawing Sheets

(56) References Cited

U.S. PATENT DOCUMENTS

2021/0023819 A1 *  1/2021  Horio ...................... B32B 27/34
2022/0184932 A1 *  6/2022  Netsu ........................ B32B 3/30
2022/0212452 A1 *  7/2022  Netsu ................... E04F 15/105
2024/0399415 A1 *  12/2024  Clement ................ B32B 13/12

FOREIGN PATENT DOCUMENTS

JP           2018-79603  A      5/2018
JP        2019-217740  A     12/2019
WO       2020/196377  A1    10/2020
WO       2020/203513  A1    10/2020

OTHER PUBLICATIONS

Extended European Search Report dated Mar. 18, 2025, issued to the European Patent Application No. 1 22779741.2.
Office Action mailed Jul. 29, 2022, issued for Japanese Patent Application No. 2022-024268 and English translation thereof.

* cited by examiner

DECORATIVE SHEET AND DECORATIVE MEMBER

TECHNICAL FIELD

The present disclosure relates to a decorative sheet and decorative member.

BACKGROUND ART

Decorative sheets are applied to various types of members, for the purpose of decoration. Examples of the various types of members include surfaces of walls of buildings; surfaces of interior spaces such as floors, ceilings, and so forth; surfaces of carpentry members such as partly-covered walls, encircling hallways, lintels, and so forth; exterior surfaces such as external walls, roofs, shutter boxes, eaves ceilings, and so forth of buildings; surfaces of outdoor structures such as fences, walls, and so forth; interior surfaces or surfaces of exterior portions of fittings, such as window frames, door frames, doors, partitions, and so forth; surfaces of furniture such as drawers, shelves, and so forth; inner surfaces or outer surfaces of vehicles such as automobiles, railway cars, ships, aircrafts, and so forth; surfaces and so forth of various types of home electronic appliances, office equipment, and so forth.

As a basic configuration, a decorative sheet has a substrate, a design layer, and a surface protective layer, in this order. This decorative sheet provides little tactile sensation. This decorative sheet cannot reproduce tactile sensation of natural wood material, such as wood veneer or the like. In recent years, improving the tactile sensation obtained from decorative sheets has been proposed (e.g., Patent Literature 1 (JP2019-217740A) and Patent Literature 2 (WO2020/196377A)).

The decorative sheet described in Patent Literature 1 has an uneven surface formed by embossing. Tactile sensation is imparted by the uneven surface. However, the tactile sensation obtained from the uneven formation cannot sufficiently reproduce the tactile sensation of natural objects such as wood grain and so forth.

The decorative sheet disclosed in Patent Literature 2 has a substrate, a design layer, raised portions, and a surface protective layer, in this order. The decorative sheet has, on the surface thereof, protruding portions corresponding to the raised portions. A certain tactile sensation can be imparted by the decorative sheet in Patent Literature 2, due to the protruding portions corresponding to the raised portions thereof. However, in the decorative sheet in Patent Literature 2, sufficient tactile sensation is obtained just from the protruding portions. As a result, tactile sensation of natural objects such as wood grain and so forth cannot be sufficiently reproduced.

SUMMARY OF INVENTION

It is an object of the present disclosure to provide a decorative sheet with excellent tactile sensation.

A first decorative sheet according to an embodiment of the present disclosure includes
   a substrate,
   a surface protective layer that is situated over the substrate and that includes a first region and a second region, and
   a raised portion that is situated between the substrate and the first region of the surface protective layer.

A maximum height Rz stipulated in JIS B0601:2013 is 25 μm or more in the first region of the surface protective layer, and is 18 μm or more in the second region of the surface protective layer,
   a skewness Ssk stipulated in ISO25178-2:2012 is greater than 0 in the first region of the surface protective layer, and is greater than 0 in the second region of the surface protective layer, and
   a kurtosis Sku stipulated in ISO25178-2:2012 is 10.0 or more in the first region of the surface protective layer and is 4.0 or more in the second region of the surface protective layer.

A second decorative sheet according to an embodiment of the present disclosure includes
   a substrate,
   a surface protective layer that is situated over the substrate and that includes a first region and a second region, and
   a raised portion that is situated between the substrate and the first region of the surface protective layer.
The surface protective layer includes a second binder resin and a second particle,
   an average thickness of the surface protective layer is smaller than the average particle size of the second particle, and
   an average thickness of the raised portion is larger than the average particle size of the second particle.

A third decorative sheet according to an embodiment of the present disclosure includes
   a substrate,
   a surface protective layer that is situated over the substrate and that includes a first region and a second region, and
   a raised portion that is situated between the substrate and the first region of the surface protective layer.
The raised portion includes a first binder resin and a first particle of which an average particle size is 10 μm or more,
   the surface protective layer includes a second binder resin and a second particle of which an average particle size is 10 μm or more and 20 μm or less,
   an average thickness of the raised portion is 20 μm or more, and
   an average thickness of the surface protective layer is 3 μm or more and 15 μm or less.

A decorative member according to an embodiment of the present disclosure includes
   any one of the first to third decorative sheets according to an embodiment of the present disclosure, and
   a support member that supports the decorative sheet.
   According to the present disclosure, a decorative sheet with excellent tactile sensation can be provided.

DESCRIPTION OF EMBODIMENTS

Figure 1:
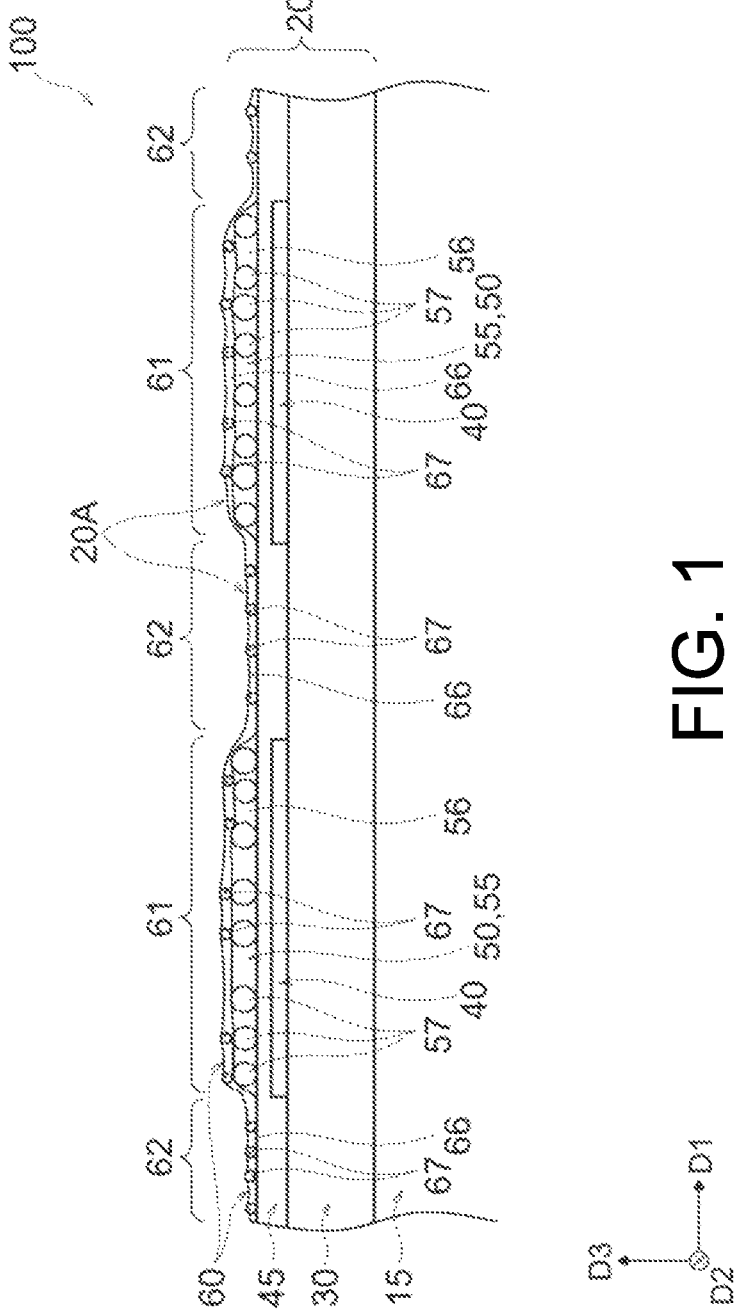
FIG. 1 is a diagram for describing a first embodiment of the present disclosure, and is a schematic cross-sectional view illustrating an example of a decorative member and a decorative sheet.

An embodiment according to the present disclosure will be described below with reference to the drawings. In the drawings attached to the present specification, scales, vertical/horizontal dimensional ratios, etc., are changed from those in reality and are exaggerated as appropriate, for the sake of ease of illustrating and understanding.

Figure 2:
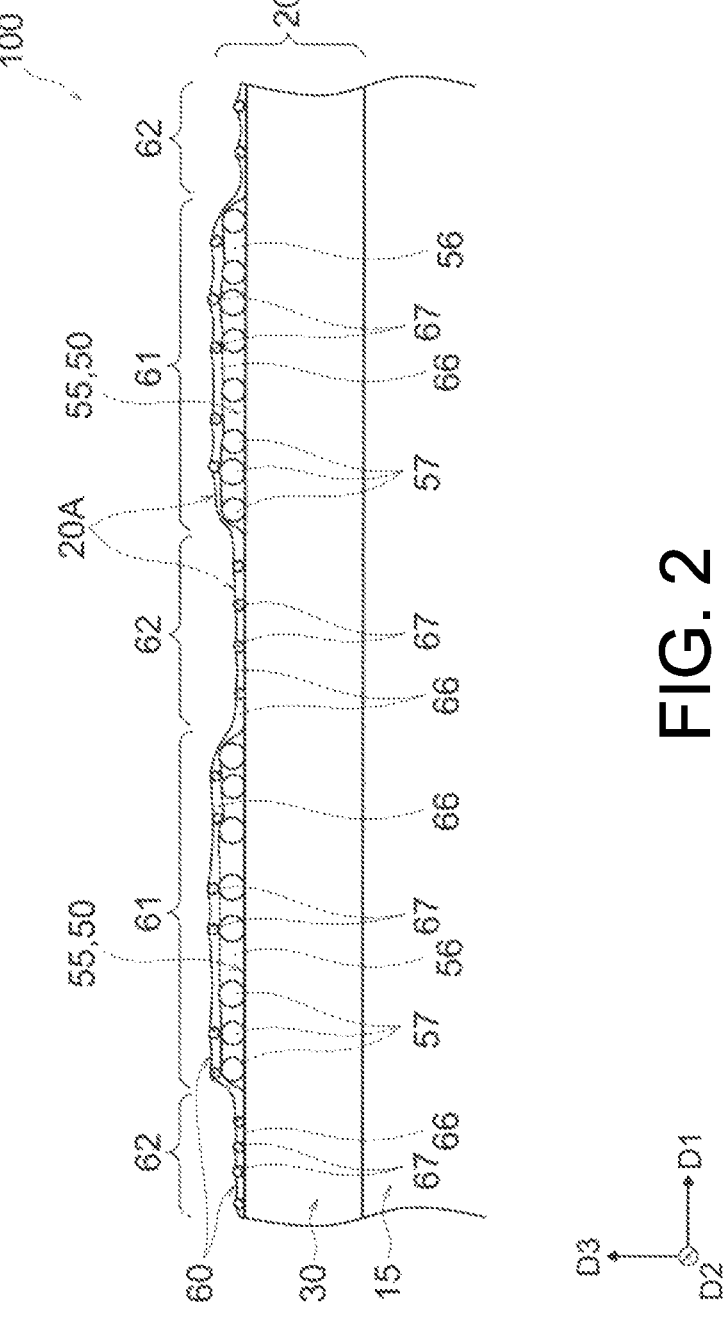
FIG. 2 is a diagram corresponding to FIG. 1, and is a schematic cross-sectional view illustrating another example of the decorative member and the decorative sheet.
Figure 3:
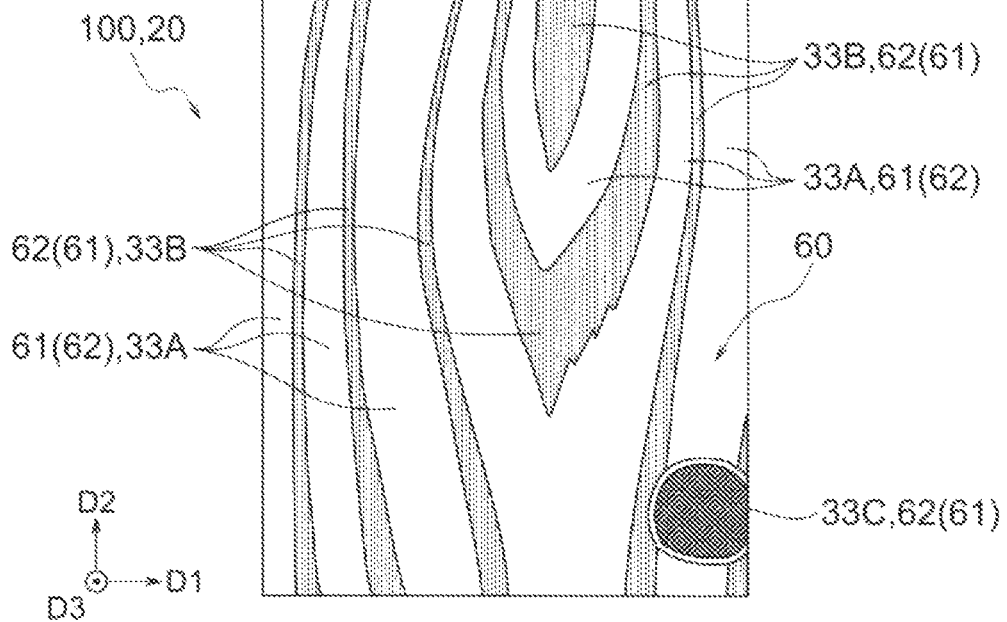
FIG. 3 is a plan view of the decorative member and the decorative sheet according to FIG. 1 or FIG. 2.

In order to clarify the relation of directions among the drawings, some of the drawings show a first direction D1, a second direction D2, and a third direction D3, which are held in common, by way of arrows denoted by common symbols. The tip side of each arrow is a first side in each direction. An arrow heading toward the far side of the page of the drawing along a direction perpendicular to the page of the drawing is represented by a symbol in which an x is inside of a circle, as illustrated in FIG. 1 and FIG. 2. An arrow heading toward the near side of the page of the drawing along the direction perpendicular to the page of the drawing is represented by a symbol in which a dot is inside of a circle, as illustrated in FIG. 3. In the illustrated examples, the third direction D3 is a normal line direction of a decorative sheet 20. The third direction is a stacking (laminating) direction in which the components making up the decorative sheet 20 are stacked (laminated). The decorative sheet 20 that is flat, which is illustrated, extends in the first direction D1 and the second direction D2. The first direction D1 and the second direction D2 are orthogonal to the third direction D3. The first direction D1 and the second direction D2 are orthogonal to each other.

[Decorative Sheet and Decorative Member]

The decorative sheet 20 includes a substrate 30, a surface protective layer 60 that is situated above the substrate 30 and that includes first regions 61 and second regions 62, and raised portions 55 that are situated between the substrate 30 and the first regions 61 of the surface protective layer 60. The substrate 30, the raised portions 55, and the surface protective layer 60 are stacked in the third direction. The raised portions 55 only face the first regions 61. The raised portions 55 do not face the second regions 62. The second regions 62 are offset from the first regions 61 in at least one of the first direction D1 and the second direction D2. The surface protective layer 60 makes up a surface 20A of the decorative sheet 20.

A maximum height Rz, skewness Ssk, and kurtosis Sku at the surface 20A of the decorative sheet 20 made up of the surface protective layer 60 may be adjusted as follows, in a decorative sheet 20 according to a first mode. The maximum height Rz is stipulated in JIS B0601:2013. The skewness Ssk and the kurtosis Sku are stipulated in ISO25178-2:2012.

Maximum height RzA at first region 61: 25 μm or more
    Maximum height RzB at second region 62: 18 μm or more
    Skewness SskA at first region 61: greater than 0
    Skewness SskB at second region 62: greater than 0
    Kurtosis SkuA at first region 61: 10.0 or more
    Kurtosis SkuB at second region 62: 4.0 or more By adjusting the maximum height Rz, the skewness Ssk, and the kurtosis Sku at the surface 20A as described above, the decorative sheet 20 has an uneven surface including high, fine, and sharp ridge portions or protruding portions in the first regions 61 above the raised portions 55. The decorative sheet 20 also has an uneven surface including high, fine, and sharp ridge portions or protruding portions in the second regions 62 over regions where the raised portions 55 are not formed. Accordingly, the entire region of the decorative sheet 20 can impart a strong tactile sensation. In addition, the first regions 61 have a greater maximum height Rz and greater kurtosis Sku as compared to the second regions 62. Accordingly, the first regions 61 include higher and sharper ridge portions or protruding portions in comparison with the second regions 62. That is to say, the tactile sensation obtained from the first regions 61 is different from the tactile sensation obtained from the second regions 62. A stronger tactile sensation is obtained from the first regions 61 than from the second regions 62. Also, the first regions 61 are perceived as being elevated overall as compared to the second regions 62, due to the raised portions 55. Thus, difference between the tactile sensation obtained from the first regions 61 and the tactile sensation obtained from the second regions 62 is perceived even more clearly. Combining these first regions 61 and second regions 62 can impart a complex and strong tactile sensation to a user touching the decorative sheet 20. That is to say, various types of tactile sensations can be imparted in an enhanced manner. The decorative sheet 20 can impart tactile sensation reproducing tactile sensation of natural objects with high precision, through rich tactile sensation expressions. Artificial impressions of the decorative sheet 20 can be subdued, and Natural features can be created in the decorative sheet 20.

In a decorative sheet 20 according to a second mode, the raised portions 55 and the surface protective layer 60 may be configured as follows. The surface protective layer 60 may include a second binder resin 66 and second particles 67. A second average thickness TB (μm) that is the average thickness of the surface protective layer 60 may be smaller than a second average particle size DB (μm) that is the average particle size of the second particles 67. A first average thickness TA that is the average thickness of the raised portions 55 may be larger than the second average particle size DB (μm).

In the above configuration, the second average thickness TB of the surface protective layer 60 is smaller than the second average particle size DB of the second particles 67. Accordingly, in the surface protective layer 60, the second particles 67 can protrude from the second binder resin 66. Accordingly, the user touching the decorative sheet 20 can be imparted with a strong tactile sensation over the entire region of the surface 20A of the decorative sheet 20 made up of the surface protective layer 60. The first average thickness TA of the raised portions 55 is greater than the second average particle size DB of the second particles 67. Thus, the first regions 61 are perceived as being elevated overall in comparison with the second regions 62. By combining such first regions and second regions, the user touching the decorative sheet 20 can be imparted with a complex and strong tactile sensation. That is to say, various types of tactile sensations can be imparted in an emphasized manner. The decorative sheet 20 can impart tactile sensation reproducing tactile sensation of natural objects with high precision, through rich tactile sensation expressions. Artificial impressions of the decorative sheet 20 can be subdued, and Natural features can be created in the decorative sheet 20.

In the decorative sheet 20 according to the second mode, the raised portions 55 may include a first binder resin 56 and first particles 57. A first average particle size DA that is the average particle size of the first particles 57 may be 0.7 times or more and 1.3 times or less the first average thickness TA of the raised portions 55.

The raised portions 55 have uneven surfaces, due to the raised portions 55 including the first binder resin 56 and the first particles 57. In the first regions 61, the surface protective layer 60 is situated above the raised portions 55 that are uneven surfaces. Accordingly, the surface protective layer 60 can have uneven surfaces that are stronger in the first regions 61 than in the second regions 62. In particular, due to the first average particle size DA that is the average particle size of the first particles 57 being 0.7 times or more and 1.3 times or less the first average thickness TA that is the average thickness of the raised portions 55, the first regions 61 include ridge portions or protruding portions that are appropriately higher and appropriately sharper as compared to the second regions 62. The first regions 61 can have a greater maximum height Rz and a greater kurtosis Sku as compared to the second regions 62. A stronger tactile sensation is imparted in the first regions 61 as compared to the second regions 62. Further, the first regions 61 are elevated in comparison with the second regions 62. According to these, the difference between the tactile sensation obtained from the first regions 61 and the tactile sensation obtained from the second regions 62 is perceived more clearly. Combining the first regions 61 and the second regions 62 enables imparting the user touching the decorative sheet 20 with a complex and strong tactile sensation. That is to say, various types of tactile sensations can be imparted in an emphasized manner. The decorative sheet 20 can impart tactile sensation reproducing tactile sensation of natural objects with high precision, through rich tactile sensation expressions. Artificial impressions of the decorative sheet 20 can be subdued, and Natural features can be created in the decorative sheet 20.

In the decorative sheet 20 according to the second mode, the maximum height Rz of the surface protective layer 60 stipulated in JIS B0601:2013 may be 18 μm or more. A strong tactile sensation can be obtained from not only the first regions 61 but from the second regions as well. A strong tactile sensation can be obtained from the entire region of the surface 20A of the decorative sheet 20.

In the decorative sheet 20 according to the second mode, the maximum height Rz of the surface protective layer 60 stipulated in JIS B0601:2013 may be greater in the first regions 61 than that in the second regions 62. A stronger tactile sensation is imparted in the first regions 61 than that in the second regions 62. Further, the first regions 61 are elevated as compared to the second regions 62. According to these, the difference between the tactile sensation obtained from the first regions 61 and the tactile sensation obtained from the second regions 62 is perceived more clearly.

As illustrated in FIG. 1 and FIG. 2, the decorative member 100 may include a support member 15 and the decorative sheet 20. The support member 15 is a member to which the decorative sheet 20 is applied. The support member 15 is imparted with design quality using the decorative sheet 20. Examples of the support member 15 include wood members used as plate members, three-dimensional objects, and so forth, of single panels, plywood, wood fiberboards such as particleboards, MDFs (medium density fiberboards), laminated wood, and so forth, of various types of wood materials such as cedar, cypress, pine, lauan, and so forth; metal members used as plate material of iron, aluminum, or the like, or steel plates, three-dimensional objects, or sheets or the like; kiln-industry-based members used as plate members, three-dimensional objects, and so forth, such as glass, ceramics such as porcelain and so forth, non-cement kiln-industry based materials such as gypsum and so forth, non-porcelain kiln-industry-based materials and so forth such as ALC (Autoclaved Lightweight aerated Concrete) plates; and resin members and so forth used as plate members, three-dimensional objects, or sheets or the like of acrylic resin, polyester resin, polyolefin resins such as polystyrene, polypropylene, and so forth, ABS (acrylonitrile-butadiene-styrene copolymer) resins, phenol resins, vinyl chloride resins, cellulose resins, rubber, and so forth.

The decorative sheet 20 may include layers other than the substrate 30 and the surface protective layer 60. The decorative sheet 20 may include a design layer 40. The design layer 40 may be situated between the substrate 30 and the surface protective layer 60 in the third direction D3. The design layer 40 may be situated between the substrate 30 and the raised portions 55 in the third direction D3. The design layer 40 has patterns of the surface of wood in the decorative sheet 20 illustrated in FIG. 3. The decorative sheet 20 may express the surface of wood. The wood expressed by the decorative sheet 20 is not limited in particular. The wood expressed by the decorative sheet 20 may be cedar, cypress, walnut, pine, cherry, and so forth. The decorative sheet 20 may express the surface texture of wood. As illustrated in FIG. 3, the decorative sheet 20 may express a cross-section of wood.

As illustrated in FIG. 1, the decorative sheet 20 may include a primer layer 45. The primer layer 45 may be situated between the raised portions 55 and surface protective layer 60, and the substrate 30, in the third direction D3. The primer layer 45 may be situated between the raised portions 55 and surface protective layer 60, and the design layer 40, in the third direction D3. The primer layer 45 may improve the adherence of the raised portions 55 and the surface protective layer 60 with the design layer 40 and the substrate 30.

The components of the decorative sheet 20 will be described in further detail below.

<Substrate>

The substrate may be in a flat plate form of a film, a sheet, a plate, or the like. Films, sheets, and plates are often referred to as films, sheets, and plates in order of relative thickness from those that are thin. In the present specification, these three are not distinguished, unless specifically stated otherwise.

Examples of the material of the substrate include resin, metal, non-metallic inorganic materials, fibrous materials, wood-based materials, and so forth. The material of the substrate can be selected as appropriate in accordance with the usage.

The substrate may be a single layer. The substrate may include two layers or more made of the above materials that are laminated. In a case in which the substrate is a laminate of two or more layers, two layers or more of different types of materials may be laminated, so as to mutually supplement the capabilities of the materials of each layer. Examples of substrates in which two layers or more are laminated include the following A to J.

(A) Laminate of resin and wood-based material
(B) Laminate of resin and metal
(C) Laminate of resin and fibrous material
(D) Laminate of resin and non-metallic inorganic material
(E) Laminate of resin 1 and resin 2
(F) Laminate of metal and wood-based material
(G) Laminate of metal and non-metallic inorganic material
(H) Laminate of metal and fibrous material
(I) Laminate of metal 1 and metal 2
(J) Laminate of non-metallic inorganic material and fibrous material In the above E, the resin 1 and the resin 2 may be different types of resin from each other. For example, the resin 1 may be olefin resin, and the resin 2 may be acrylic resin. In the above I, the metal 1 and the metal 2 may be different types of metal from each other. For example, the metal 1 may be copper, and the metal 2 may be chromium.

In a case in which the substrate is a laminate such as the above A to J, a layer (adhesive agent layer or the like) for increasing adhesive force may be provided between the layers making up the laminate.

Examples of resins used for the substrate include various types of synthetic resins and natural resins. Examples of synthetic resins include thermoplastic resins and cured product of curable resin compositions.

Examples of thermoplastic resins include olefin resins such as polyethylene, polypropylene, polymethylpentene, ionomers, and various types of olefin thermoplastic elastomers, vinyl chloride-based resins such as polyvinyl chloride, polyvinylidene chloride, and vinyl chloride-vinyl acetate copolymers, polyester resins such as polyethylene terephthalate, polybutylene terephthalate, polyethylene naphthalate, ethylene glycol-terephthalic acid-isophthalic acid copolymers, and polyester thermoplastic elastomers, acrylic resins such as polymethyl (meth)acrylate, polyethyl (meth) acrylate, polybutyl (meth)acrylate, and methyl (meth)acrylate-butyl (meth)acrylate copolymers, polyamide resins as typified by nylon 6, nylon 66, and so forth, cellulose-based resins such as cellulose triacetate, cellophane, and celluloid, styrene-based resins such as polystyrene, acrylonitrile-styrene copolymers, and acrylonitrile-butadiene-styrene copolymer (ABS), polyvinyl alcohol, ethylene-vinyl acetate copolymers, ethylene-vinyl alcohol copolymers, polycarbonate resins, polyarylate resins, polyimide resins, and so forth. Examples of curable resin compositions include thermal curing resin compositions and ionizing-radiation-curing resin compositions which will be exemplified in the raised portions 55 described later. Examples of natural resin include natural rubber, pine resin, amber, and so forth.

Examples of the metallic material used for the substrate include aluminum or an alloy that includes aluminum such as duralumin or the like, iron or an alloy that includes iron such as carbon steel, stainless steel, or the like, copper or an alloy that includes copper such as brass, bronze, or the like, gold, silver, chromium, nickel, cobalt, tin, titanium, or the like. The metal substrate may include a plated layer in which these metals are plated.

Examples of non-metallic inorganic materials used for the substrate include non-ceramic kiln-industry-based materials such as cement, ALC (Autoclaved Lightweight aerated Concrete), plaster, calcium silicate, wood chip cement, and so forth, ceramic-based kiln-industry-based materials such as porcelain, earthenware, glass, enamel, and so forth, and natural rock such as limestone, marble, granite, andesite, and so forth.

Examples of the fibrous material used for the substrate include papers such as tissue paper, kraft paper, wood-free paper, Japanese washi paper, titanium paper, linter paper, tracing paper, paraffin paper, parchment paper, glassine, wallpaper backing paper, paperboard, base paper for gypsum board, and so forth; and woven fabrics and non-woven fabrics made up of fibers such as silk, cotton, hemp, polyester resin fiber, acrylic resin fiber, glass fiber, carbon fiber, and so forth. A resin such as acrylic resin, styrene-butadiene rubber, melamine resin, urethane resin, or the like, may further be added to the paper in order to raise the strength between fibers of the paper substrate and to suppress fluffing of the paper substrate. Examples of paper with resin added include reinforced paper, resin-impregnated paper, and so forth. Examples of a substrate in which a resin layer is laminated on a fibrous material layer include a wallpaper raw material or the like in which a resin layer such as a vinyl chloride resin layer, olefin resin layer, acrylic resin layer, or the like, is layered on the surface of wallpaper backing paper.

The substrate may contain an additive as necessary. In a case in which the material of the substrate is resin, examples of the additive include inorganic filler such as calcium carbonate, clay, and so forth, flame retardants such as magnesium hydroxide, antioxidants, lubricants, foaming agents, ultraviolet light absorbing agents, light stabilizers, and so forth. The amount of the additive contained is not limited in particular, as long as within a range in which workability properties and so forth are not impeded, and can be set as appropriate in accordance with required properties and so forth.

The shape and dimensions of the substrate are not limited in particular. The shape and dimensions of the substrate can be selected as appropriate in accordance with the usage, desired capabilities, and workability properties. In a case in which the substrate has a flat plate form such as a film, a sheet, or a plate, the thickness of the substrate is not limited in particular. From the perspective of manufacturing workability, mechanical strength, handleability, and economic performance, the thickness of the substrate generally may be around 10 μm or more, and 10 cm or less. The thickness of the substrate may be 20 μm or more and 300 μm or less. The thickness of the substrate may be 1 mm or more and 2 cm or less.

In the substrate, in order to improve adherence to other layers making up the decorative member, the substrate may be subjected to surface treatment on one face or both faces thereof, such as oxidization, physical surface treatment such as roughening and so forth, or chemical surface treatment and so forth. Examples of oxidization include corona discharge treatment, chromium oxidation treatment, flame treatment, hot air treatment, ozone-ultraviolet light treatment, and so forth. Examples of roughening include sandblasting, solvent treatment, and so forth. These surface treatments can be selected as appropriate, in accordance with the type of the substrate. Corona discharge treatment is superior from the perspectives of effects of the surface treatment, operability, and so forth.

<Raised Portion and Raised Layer>

The decorative sheet 20 includes a raised layer 50 between the substrate 30 and the surface protective layer 60. The raised layer 50 includes the above-described raised portions 55. The raised layer 50 may include a plurality of raised portions 55 that are separated from each other. As illustrated in FIG. 1, the raised layer 50 is laid out in partial regions on the substrate 30. The raised portions 55 are situated in regions facing the first regions 61 of the surface protective layer 60. The raised portions 55 are not situated in regions facing the second regions 62 of the surface protective layer 60.

In a case in which the raised portions 55 are provided in all regions on the substrate, the same tactile sensation is imparted from all regions of the decorative sheet 20. Accordingly, tactile sensation of natural objects cannot be sufficiently reproduced. By laying out the raised portions 55 in just partial regions on the substrate 30 it is possible to reproduce the tactile sensation obtained from natural objects, due to the difference between the tactile sensation obtained from the first regions 61 of the surface protective layer 60 that are on the raised portions 55, and the tactile sensation obtained from the second regions 62 of the surface protective layer 60 that are on regions in which the raised portions 55 are not provided, whereby Natural features can be created in the decorative sheet 20.

Also, positioning the raised portions 55 on part of the substrate 30 enables perception that the first regions 61 of the surface protective layer 60 are elevated more than the second regions 62 thereof, through both sight and sense of touch. Natural features can be created in the decorative sheet 20 from this point as well.

The proportion of the area of regions in which the raised portions 55 are positions as to the entire area of the substrate may be 5% or more and 90% or less, may be 10% or more and 80% or less, or may be 15% or more and 70% or less. According to such an area proportion of the raised portions 55, difference in the tactile sensation obtained from the first regions 61 and the tactile sensation obtained from the second regions 62 can be emphasized.

The area proportion of regions where the raised portions are provided can be measured as follows. First, three test pieces that are 30 cm×30 cm are cut out from random positions of a decorative sheet that is 1 m×1 m in size. Next, image analysis is performed regarding each of the test pieces, and the area proportion of the regions where the raised portions are provided is calculated. The area proportion is identified as an average value of measurement values of the area proportions of the three test pieces. In a case in which the size of the decorative sheet is not 1 m×1 m, the size of the test pieces are decided so as to have the same area proportion as the area proportion of the test sheets as to the decorative sheet in a case in which the size of the test pieces is 30 cm×30 cm with respect to the size of 1 m×1 m above.

The shape of the raised portions 55 is not limited in particular. For example, the raised portions 55 may include halftone-dot-like protrusion groups in plan view, which are collections of small protrusions. The raised portions 55 may include elliptic portions in plan view that are larger than the protrusions. At the time of printing a resin composition for forming the raised portions so as to form the raised portions 55, the elliptic portions that are larger than the protrusions may be obtained by printing the resin composition in regions that are elliptic from the beginning. An arrangement may be made in which a great number of small protrusions are printed, which connect to each other due to leveling of the resin composition, and become elliptic portions that are larger than the protrusions as a result.

The raised portions 55 including the protrusion groups can impart a more delicate tactile sensation. The raised portions 55 including the protrusion groups can exhibit excellent design quality. The raised portions 55 obtained by the leveling and connecting of the protrusion groups readily have elliptic shapes and irregular shapes in plan view. The raised portions 55 fabricated by the protrusion groups becoming connected by leveling can reproduce the textures of natural objects such as wood-grain patterns in a truer manner, and have a high level of design quality.

For example, in a case of the decorative sheet 20 reproducing the design outer appearance of a natural wood material board, more specifically a "wood-grain pattern", tactile sensations of duct grooves, growth ring patterns, and knots of the natural wood material board can be reproduced by the raised portions 55, as illustrated in FIG. 3. The tactile sensation of duct grooves of the natural wood material board can be reproduced by the raised portions 55 as in the following (a). In the case of (a), (a1) or (a2) can be selected. As in (b), the tactile sensation of growth ring patterns can be reproduced by the raised portions 55. In the case of (b), (b1) or (b2) can be selected. As in (c), the tactile sensation of knots can be reproduced by the raised portions 55. In the case of (c), (c1) or (c2) can be selected. The (a1), (a2), (b1), (b2), (c1), and (c2) can be selected as appropriate in accordance with the type of the word material regarding which the surface tactile sensation is to be reproduced (e.g., difference among cedar material, zelkova material, and so forth), the type of surface finish of the wood material (difference among planing, charring processing, weathering processing, and so forth), preferences of the user of the decorative sheet, and so forth. Two or more of (a), (b), and (c) may be combined.

(a) The tactile sensation of duct grooves in a natural wood material board is reproduced by the raised portions 55.

(a1) The raised portions 55 are formed in regions of duct grooves in a natural wood material board, or in regions in the proximity thereof in plan view. Specifically, the raised portions 55 may be formed on part or all of inside of individual duct grooves, part or all of surroundings of individual duct grooves, or part or all of inside of individual duct grooves and part or all of surroundings thereof.

(a2) The raised portions 55 may be formed in regions other than regions of duct grooves in a natural wood material board, i.e., in part or all of regions in which duct grooves are not present in plan view.

(b) The tactile sensation of growth ring patterns in a natural wood material board is reproduced by the raised portions 55.

(b1) The raised portions 55 are formed in regions of earlywood portions 33A in growth ring patterns in a natural wood material board, or in regions in the proximity thereof in plan view. More specifically, the raised portions 55 may be formed on part or all of inside of individual earlywood portions 33A, part or all of surroundings of individual earlywood portions 33A, or part or all of inside of individual earlywood portions 33A and part or all of surroundings thereof.

(b2) The raised portions 55 are formed in regions of latewood portions 33B in growth ring patterns in a natural wood material board, or in regions in the proximity thereof in plan view. More specifically, the raised portions 55 may be formed on part or all of inside of individual latewood portions 33B, part or all of surroundings of individual latewood portions 33B, or part or all of inside of individual latewood portions 33B and part or all of surroundings thereof.

(c) The tactile sensation of knots 33C in a natural wood material board is reproduced by the raised portions 55.

(c1) The raised portions 55 are formed in regions of knots 33C in a natural wood material board, or in regions in the proximity thereof in plan view. More specifically, the raised portions 55 may be formed on part or all of inside of individual knots 33C, part or all of surroundings of individual knots 33C, or part or all of inside of individual knots 33C and part or all of surroundings thereof.

(c2) The raised portions 55 may be formed in regions other than regions of knots 33C in a natural wood material board, i.e., in part or all of regions in which knots 33C are not present in plan view.

As described above, the raised portions 55 may include the first binder resin 56 and the first particles 57. The first binder resin 56 holds the first particles 57.

«First Binder Resin»

Examples of the first binder resin 56 of the raised portions 55 include thermoplastic resins or cured product of curable resin compositions. Cured product of curable resin compositions have excellent scratch resistance properties. With regard to this point, the first binder resin 56 may include cured product of curable resin compositions. The proportion of the cured product of curable resin compositions as to the entire amount of the first binder resin 56 may be 50% by mass or more, may be 70% by mass or more, may be 90% by mass or more, and may be 100% by mass or more.

Examples of thermoplastic resin include acrylic resins, cellulose resins, urethane resins, vinyl chloride resins, polyester resins, polyolefin resins, polycarbonate, nylon, polystyrene, ABS resins, and so forth.

Examples of cured product of curable resin compositions include cured product of thermal curing resin compositions and cured product of ionizing-radiation-curing resin compositions. Cured product of thermal curing resin compositions is excellent regarding both scratch resistance properties and soiling resistance properties. Cured product of thermal curing resin compositions is readily used along with ultraviolet light absorbing agents. Cured product of ionizing-radiation-curing resin compositions is excellent regarding both scratch resistance properties and soiling resistance properties. Cured product of ionizing-radiation-curing resin compositions is excellent regarding maintenance of capabilities over time.

Thermal curing resin compositions are compositions including at least thermal curing resin, and are resin compositions that harden under application of heat. Examples of thermal curing resin include acrylic resins, urethane resins, phenol resins, urea-melamine resins, epoxy resins, unsaturated polyester resins, silicone resins, and so forth. In addition to these thermal curing resins, a curing agent, a curing catalyst, and so forth, may be added to the thermal curing resin compositions as necessary.

Examples of thermal curing resin compositions include a two-component-curing composition, in which a polyol resin serves as a primary agent and an isocyanate compound serves as a curing agent. Examples of polyol resins include acrylic polyols, polyester polyols, and so forth.

Examples of ionizing-radiation-curing resin compositions include electron-beam-curing resin compositions and ultraviolet-light-curing resin compositions. Electron-beam-curing resin compositions are excellent with regard to points of little smell due to no need for a polymerization initiator, coloration does not readily occur, and so forth. In a case of the raised portions 55 containing an ultraviolet light absorbing agent, which will be described later, cross-linking density of the raised portions 55 can be raised in the electron-beam-curing resin compositions, and scratch resistance properties and soiling resistance properties are excellent.

An ionizing-radiation-curing resin composition is a composition containing a compound that has an ionizing-radiation-curing functional group (hereinafter referred to as "ionizing-radiation-curing compound"). An ionizing-radiation-curing functional group is a group that exhibits cross-linking curing under irradiation of ionizing radiation. Examples of ionizing-radiation-curing functional groups include functional groups having an ethylenic double bond, such as (meth)acryloyl groups, vinyl groups, allyl groups, and so forth. Examples of ionizing-radiation-curing functional groups also include epoxy groups and oxetanyl groups.

In the present specification, a (meth)acryloyl group means an acryloyl group or a methacryloyl group. In the present specification, (meth)acrylate means acrylate or methacrylate. Ionizing radiation means, out of electromagnetic waves and charged particle beams, those that have energy quantum capable of polymerization or cross-bridging of molecules. Examples of ionizing radiation include ultraviolet light (UV) and electron beams (EB). Examples of ionizing radiation include electromagnetic waves such as X-rays, gamma rays and so forth, and charged particle beams such as alpha rays, ion beams, and so forth.

Ionizing-radiation-curing compounds may specifically be selected as appropriate from polymerizable monomers and polymerizable oligomers (sometimes referred to as "polymerizable prepolymers"), which conventionally have been in common use as ionizing-radiation-curing resins.

Ionizing-radiation-curing compounds may be compounds having two or more ethylenically unsaturated binding groups. Ionizing-radiation-curing compounds may be polyfunctional (meth)acrylate compounds having two or more ethylenically unsaturated binding groups. A polyfunctional (meth)acrylate compound may be either of a monomer or an oligomer.

Out of polyfunctional (meth)acrylate compounds, examples of bifunctional (meth)acrylate monomers include ethylene glycol di(meth)acrylate, bisphenol A tetraethoxy diacrylate, bisphenol A tetrapropoxy diacrylate, 1,6-hexanediol diacrylate, and so forth. Examples of trifunctional or higher(meth)acrylate monomers include trimethylolpropane tri(meth)acrylate, pentaerythritol tri(meth)acrylate, pentaerythritol tetra(meth)acrylate, dipentaerythritol hexa(meth)acrylate, dipentaerythritol tetra(meth)acrylate, isocyanurate-modified tri(meth)acrylate, and so forth. Examples of polyfunctional (meth)acrylate oligomers include acrylate polymers, such as urethane (meth)acrylate, epoxy (meth)acrylate, polyester (meth)acrylate, polyether(meth)acrylate, and so forth, and the like.

Urethane (meth)acrylate may be obtained by reaction of polyhydric alcohol and organic diisocyanate with hydroxy (meth)acrylate, for example.

Preferable epoxy (meth)acrylate may be (meth)acrylate obtained by reaction of trifunctional or higher aromatic epoxy resins, alicyclic epoxy resins, aliphatic epoxy resins, or the like, with (meth)acrylic acid, (meth)acrylate obtained by reaction of bifunctional or higher aromatic epoxy resins, alicyclic epoxy resins, aliphatic epoxy resins, or the like, with polybasic acid and (meth)acrylic acid, or (meth)acrylate obtained by reaction of bifunctional or higher aromatic epoxy resins, alicyclic epoxy resins, aliphatic epoxy resins, or the like, with phenols and (meth)acrylic acid.

One type of the ionizing-radiation-curing resin may be used alone, or two or more types thereof may be used in combination.

In a case in which the ionizing-radiation-curing compound is an ultraviolet-curing compound, the ionizing-radiation-curing resin composition may include an additive such as a photopolymerization initiator and a photopolymerization promoter, or the like. The photopolymerization initiator may include one type or more selected from acetophenone, benzophenone, α-hydroxyalkylphenone, Michler's ketone, benzoin, benzyl dimethylketal, benzoyl benzoate, α-acyl oxime ester, thioxanthones, and so forth. The photopolymerization promoter can mitigate inhibition of polymerization by air at the time of curing, and can accelerate curing. Examples of the photopolymerization promoter may include one type or more selected from p-dimethyl aminobenzoic acid isoamyl ester, p-dimethyl aminobenzoic acid ethyl ester, and so forth.

«First Particles»

The raised portions 55 may include the first particles 57. The first average particle size DA that is the average particle size of the first particles 57 can be decided taking into consideration a desired tactile sensation. The first average particle size DA of the first particles 57 may be 10 μm or more. By making the first average particle size DA of the first particles 57 to be 10 μm or more, the tactile sensation obtained from the regions in which the raised portions 55 are laid out, i.e., the first regions 61, can be emphasized, and the tactile sensation obtained from the decorative sheet can be sufficiently improved. The first average particle size DA that is the average particle size of the first particles 57 may be 15 μm or more, may be 20 μm or more, or may be 25 μm or more.

By setting an upper limit to the first average particle size DA of the first particles 57, the first particles 57 can be suppressed from coming loose from the raised portions 55. Setting an upper limit to the first average particle size DA of the first particles 57 enables drastically large protruding portions from being generated by the first particles 57, and tactile sensation of natural objects can be reproduced with good precision. With this in mind, the first average particle size DA of the first particles 57 may be 50 μm or less, may be 40 μm or less, or may be 35 μm or less.

The particle sizes (m) of the first particles 57 and the second particles 67, which will be described later, are the greatest widths of the particles in a vertical section of the decorative sheet, i.e., the greatest lengths. The particle sizes (m) of the first particles 57 and the second particles 67 are the greatest widths of the particles 57 and 67 in a cross-section taken along the normal direction D3 of the decorative sheet, i.e., the greatest lengths, as illustrated in FIG. 1. The average particle sizes (m) of the particles 57 and 67 are identified by observing thirty enlarged cross-sectional regions having a length of 500 μm or more and 1500 μm or less in a direction orthogonal to the normal direction of the decorative sheet, measuring the particle size of one particle that is the largest in each cross-sectional region, and taking the average value (m) of the grain sizes of the thirty particles that are measured as the particle size thereof.

Examples of the first particles 57 include resin particles and inorganic particles. Resin particles can be formed with a large average particle size, and as a result can impart a strong tactile sensation. The shape of the first particles 57 is not limited in particular. The shape of the first particles 57 preferably is spherical. The shape of the first particles 57 may be irregular.

The resin particles serving as the first particles 57 may include one or more type of resin, such as polymethyl methacrylate, polyacrylic-styrene copolymers, melamine resin, urethane resin, polyamide resins such as Nylon, polycarbonate, polystyrene, polyvinyl chloride, benzoguanamine-melamine-formaldehyde condensates, silicon resin, fluororesin, polyester resin, and so forth. Preferably, the first particles 57 are polymethyl methacrylate particles. Inorganic particles serving as the first particles 57 may be the inorganic particles that will be exemplified with regard to the second particles 67 described later.

The content of the first particles 57 as to 100 parts by mass of the first binder resin 56 may be 5 parts by mass or more and 70 parts by mass or less, may be 10 parts by mass or more and 60 parts by mass or less, or may be 20 parts by mass or more and 50 parts by mass or less. By making the content of the first particles 57 as to 100 parts by mass of the first binder resin 56 to be 5 parts by mass or more, a strong tactile sensation can be imparted. By making the content of the first particles 57 as to 100 parts by mass of the first binder resin 56 to be 70 parts by mass or less, deterioration in strength of the raised portions 55 can be suppressed.

«Thickness»

The thickness of the raised portions 55 can be decided taking into consideration the desired tactile sensation. The average thickness of the raised portions 55 may be 20 μm or more. By making the average thickness of the raised portions 55 to be 20 μm or more, the elevation of the first regions 61 facing the raised portions 55 is more readily perceived through sense of touch and sight. Making the average thickness of the raised portions 55 to be 20 μm or more can suppress the first particles 57 from coming loose from the first binder resin 56. The average thickness of the raised portions 55 may be 22 μm or more, may be 25 μm or more, or may be 27 μm or more.

Setting an upper limit to the average thickness of the raised portions 55 enables the elevation of the first regions 61 due to the raised portions 55 to be appropriate. Thus, a situation in which the tactile sensation is too strong to the point of being unnatural can be suppressed. In light of this point, the average thickness of the raised portions 55 may be 60 μm or less, or may be 50 μm or less. A measurement method of the first average thickness TA of the raised portions 55 will be described later along with a measurement method of the second average thickness TB of the surface protective layer 60.

The value of the ratio of the first average particle size DA (μm) that is the average particle size of the first particle as to the first average thickness TA (μm) that is the average thickness of the raised portions 55, i.e., the "average particle size of first particles 57/average thickness of raised portions 55" may be 0.7 or more and 1.3 or less, may be 0.8 or more and 1.2 or less, or may be 0.9 or more and 1.1 or less. By making the "average particle size of first particles 57/average thickness of raised portions 55" to be 0.7 or more, the decorative sheet 20 imparts a strong tactile sensation. By making the "average particle size of first particles 57/average thickness of raised portions 55" to be 1.3 or less, the first particles 57 can be suppressed from coming loose from the first binder resin 56.

The raised portions 55 may contain an additive as necessary. Examples of additives include antioxidants, ultraviolet light absorbing agents, light stabilizers, leveling agents, and so forth.

The raised portions 55 can be fabricated by, for example, coating the substrate with a composition for raised portions, performing drying thereof, and curing as necessary. The composition for raised portions may include the first binder resin 56, the first particles 57, and further a solvent or the like that is added as necessary.

«Surface Protective Layer»

The surface protective layer 60 includes the first regions 61 facing the raised portions 55 in the third direction D3, and the second regions 62 that do not face the raised portions 55 therein. The raised portions 55 face only the first regions 61. The first regions 61 and the second regions 62 are situated above the substrate 30. The first regions 61 and the second regions 62 are overlapped with the substrate 30 in projection in the third direction D3.

By combining the raised portions 55 and the surface protective layer 60 in the decorative sheet 20, difference between the tactile sensation obtained from the surface protective layer 60 by the first regions 61 facing the raised portions 55, and the tactile sensation obtained from the surface protective layer 60 by the second regions 62 not facing the raised portions 55, can be perceived. This difference in tactile sensation can impart complex tactile sensations to the user touching the decorative sheet 20. That is to say, various types of tactile sensations can be imparted. The decorative sheet 20 can impart tactile sensations reproducing tactile sensations of natural objects with high precision, through rich expressions of tactile sensations. Artificial impressions of the decorative sheet 20 can be subdued, and natural features can be created in the decorative sheet 20.

The surface protective layer 60 may be situated in at least part of regions facing the raised portions 55, and at least part of regions not facing the raised portions 55. The surface protective layer 60 may be situated in the entirety of regions facing the raised portions 55, and the entirety of regions not facing the raised portions 55. The surface protective layer 60 may face the entire region of the substrate 30 in the third direction D3. That is to say, the surface protective layer 60 may be laid out over the entire region of the decorative sheet 20. By the surface protective layer 60 being laid out over the entire region of the decorative sheet 20, effects of the difference in tactile sensation described above become more pronounced. Laying out the surface protective layer 60 over the entire region of the decorative sheet 20 improves the scratch resistance properties of the decorative sheet 20.

The surface protective layer 60 may include the second binder resin 66 and the second particles 67. The second binder resin 66 holds the second particles 67.

«Second Binder Resin»

Examples of the second binder resin 66 of the surface protective layer 60 include thermoplastic resins and cured product of curable resin compositions. Cured product of curable resin compositions has excellent scratch resistance properties. With regard to this point, the second binder resin 66 may include cured product of a curable resin composition. The proportion of the cured product of the curable resin composition as to the entire amount of the second binder resin 66 may be 50% by mass or more, may be 70% by mass or more, may be 90% by mass or more, or may be 100% by mass.

The thermoplastic resin used in the second binder resin 66 may be a thermoplastic resin exemplified in the first binder resin 56 of the raised portions 55.

Examples of cured product of curable resin compositions include cured product of thermal curing resin compositions and cured product of ionizing-radiation-curing resin compositions. Cured product of thermal curing resin compositions is excellent regarding both scratch resistance properties and soiling resistance properties. Cured product of thermal curing resin compositions is readily used along with ultraviolet light absorbing agents. Cured product of ionizing-radiation-curing resin compositions is excellent regarding both scratch resistance properties and soiling resistance properties. Cured product of ionizing-radiation-curing resin compositions is also excellent regarding maintenance of capabilities over time.

The cured product of the thermal curing resin composition used in the second binder resin 66 may be a cured product of the thermal curing resin compositions exemplified in the first binder resin 56 of the raised portions 55. The cured product of the ionizing-radiation-curing resin composition used in the second binder resin 66 may be a cured product of the ionizing-radiation-curing resin compositions exemplified in the first binder resin 56 of the raised portions 55.

«Second Particles»

The surface protective layer 60 may include the second particles 67. The second average particle size DB that is the average particle size of the second particles 67 can be decided taking into consideration a desired tactile sensation. The second average particle size DB of the second particles 67 may be 10 μm or more. The second average particle size DB of the second particles 67 may be 10 μm or more and 20 μm or less. By making the second average particle size DB of the second particles 67 to be 10 μm or more, the tactile sensation obtained from the surface protective layer 60 can be emphasized. Thus, the tactile sensation obtained from the decorative sheet 20 can be sufficiently improved. By making the second average particle size DB of the second particles 67 to be 20 μm or less, the difference in the tactile sensation obtained from the first regions 61 facing the raised portions 55, and the tactile sensation obtained from the second regions 62 not facing the raised portions 55, becomes pronounced. As a result, the decorative sheet 20 can sufficiently reproduce tactile sensation of natural objects. By making the second average particle size DB of the second particles 67 to be 20 μm or less, the second particles 67 can be suppressed from coming loose from the second binder resin 66.

The second average particle size DB of the second particles 67 may be 10 μm or more and 20 μm or less, may be 11 μm or more and 18 μm or less, and may be 12 μm or more and 17 μm or less.

The second average particle size DB of the second particles 67 may be smaller than the first average particle size DA of the first particles 57. That is to say, a relation of "second average particle size DB<first average particle size DA" may be satisfied. Satisfying this relation enables the above-described difference in the tactile sensation obtained from the first regions 61 and the tactile sensation obtained from the second regions 62 to be emphasized, and tactile sensation obtained from natural objects can be sufficiently reproduced by the decorative sheet. "First average particle size DA of first particles 57 minus second average particle size DB of second particles 67" may be 5 μm or more, may be 10 μm or more, or may be 12 μm or more. Setting an upper limit to "First average particle size DA of first particles 57 minus second average particle size DB of second particles 67" enables the above-described difference in tactile sensation to be made appropriate. Accordingly, tactile sensation obtained from natural objects can be reproduced with high precision. From this perspective, "first average particle size DA of first particles 57 minus second average particle size DB of second particles 67" may be 40 μm or less, may be 30 μm or less, or may be 20 μm or less.

Examples of the second particles 67 include resin particles and inorganic particles. Inorganic particles can reduce the gloss of the decorative sheet 20. By suppressing the gloss of the decorative sheet 20, unnaturalness of the texture of the decorative sheet 20 is suppressed, and natural texture can be reproduced. The shape of the second particles 67 is not limited in particular. The shape of the second particles 67 preferably is spherical. The shape of the second particles 67 may be irregular.

The resin particles used as the second particles 67 may be the organic particles exemplified with the first particles 57. The inorganic particles used as the second particles 67 may include one or more types of inorganic substances, such as silica, alumina, zirconia, titania, and so forth. The second particles 67 preferably are silica.

The content of the second particles 67 as to 100 parts by mass of the second binder resin 66 may be 5 parts by mass or more and 70 parts by mass or less, may be 10 parts by mass or more and 60 parts by mass or less, or may be 20 parts by mass or more and 50 parts by mass or less. By making the content of the second particles 67 as to 100 parts by mass of the second binder resin 66 to be 5 parts by mass or more, the tactile sensation is readily made to be excellent, and further, gloss of the decorative sheet 20 can be suppressed. By making the content of the second particles 67 as to 100 parts by mass of the second binder resin 66 to be 70 parts by mass or less, deterioration in strength of the surface protective layer 60 can be suppressed.

«Thickness»

The thickness of the surface protective layer 60 can be decided taking into consideration the desired tactile sensation. The second average thickness TB that is the average thickness of the surface protective layer 60 may be 3 μm or more and 15 μm or less. By making the second average thickness TB of the surface protective layer 60 to be 3 µm or more, the second particles 67 can be suppressed from coming loose from the second binder resin 66. This can impart excellent scratch resistance properties to the decorative sheet 20. By making the second average thickness TB to be 15 µm or less, the elevation of the raised portions 55 can be maintained on the surface of the decorative sheet 20. Thus, the decorative sheet 20 can impart complex and strong tactile sensation. Taking the above effects into consideration, the average thickness of the surface protective layer may be 4 µm or more and 13 µm or less, may be 5 µm or more and 12 µm or less, may be 6 µm or more and 10 µm or less, or may be 7 µm or more and 10 µm or less.

In the decorative sheet 20 according to the present embodiment, the second average thickness TB of the surface protective layer 60 and the first average thickness TA of the raised portions 55 may be adjusted as follows. The value of the ratio of the second average thickness TB that is the average thickness of the surface protective layer 60 as to the first average thickness TA (µm) that is the average thickness of the raised portions 55, i.e., the "second average thickness TB of the surface protective layer 60/first average thickness TA of raised portions 55" may be 0.15 or more and 0.75 or less, may be 0.20 or more and 0.65 or less, may be 0.25 or more and 0.55 or less, or may be 0.25 or more and less than 0.50. By adjusting the "second average thickness TB of the surface protective layer 60/first average thickness TA of raised portions 55" to be within the above numerical value range, the difference between the tactile sensation of the decorative sheet 20 obtained from the first regions 61 facing the raised portions and the tactile sensation of the decorative sheet 20 obtained from the second regions 62 not facing the raised portions 55 can be made to be appropriate.

In the decorative sheet 20 according to the present embodiment, the second average thickness TB of the surface protective layer 60 and the second average particle size DB of the second particles 67 may be adjusted as follows. The value of the ratio of the second average particle size DB (µm) that is the average particle size of the second particles 67 as to the second average thickness TB (µm) that is the average thickness of the surface protective layer 60, i.e., the "second average particle size DB of second particles 67/second average thickness TB of surface protective layer 60" may be 1.3 or more and 2.5 or less, may be 1.4 or more and 2.3 or less, or may be 1.5 or more and 2.1 or less. By making the "second average particle size DB of second particles 67/second average thickness TB of surface protective layer 60" to be 1.3 or more, the tactile sensation obtained from the surface protective layer 60 can be sufficiently emphasized. By making the "average particle size of second particles 67/average thickness of surface protective layer" to be 2.5 or less, the second particles 67 can be suppressed from coming loose from the second binder resin 66.

The average thickness of each part that is the object of measurement is identified by the steps of the following (X1) to (X3).

(X1) A cross-sectional region taken along the normal direction of the decorative sheet 20, in which a width thereof following a direction orthogonal to the normal direction is 500 µm or more and 1500 µm or less, is observed. In this cross-sectional region, the thickness of parts that are the object of measurement is measured every 25 µm along the width direction of the decorative sheet. For example, measurement of thickness is performed for 20 positions in a cross-sectional region that is 500 µm wide.

(X2) The thickness measurement in the above (X1) is performed regarding cross-sectional regions of nine more views.

(X3) The arithmetic mean value of all thickness measurement values measured in the cross-sectional regions of the ten views is taken as the average thickness (µm) of the object part.

The second average thickness TB of the surface protective layer 60 and the first average thickness TA of the raised portions 55 are identified as follows, due to situations being assumed in which the boundary between the surface protective layer 60 and the raised portions 55 is not clear.

The second average thickness TB of the surface protective layer 60 is identified from the value of thickness of the surface protective layer 60 measured in the second regions 62 in accordance with the above (X1) to (X3).

The average thickness TA of the raised portions 55 is identified by the following procedures. First, the average thickness of the total of the raised portions 55 and the surface protective layer in the first regions 61 is identified in accordance with the above (X1) to (X3). Next, the second average thickness TB of the surface protective layer 60 is identified by measurement values in the second regions 62. The difference between the average thickness of the total of the raised portions 55 and the surface protective layer 60, and the second average thickness TB of the surface protective layer 60, is identified as the first average thickness TA of the raised portions 55.

The surface protective layer 60 may contain an additive as necessary. Examples of additives include antioxidants, ultraviolet light absorbing agents, light stabilizers, leveling agents, and so forth.

The surface protective layer 60 can be fabricated by, for example, coating the substrate 30 on which the raised portions 55 are formed with a surface protective layer composition, performing drying thereof, and curing as necessary. The surface protective layer composition may include materials making up the surface protective layer (binder resin, particles, and so forth), and a solvent or the like that is added as necessary.

<Other Layers>

The decorative sheet 20 may include layers other than the substrate 30, the raised portions 55, and the surface protective layer 60. Examples of other layers include the design layer 40, the primer layer 45, adhesive agent layers, and so forth.

«Design Layer»

As illustrated in FIG. 1, the decorative sheet 20 may include the design layer 40, in order to improve design quality. The design layer 40 has designs. The design layer 40 is an ornamental layer. The design layer 40 may be laid out near the substrate 30, from the perspective of improving weatherproofing of the design layer 40. The design layer 40 may be positioned in at least one of between the substrate 30 and the raised portions 55 in the third direction D3, and on the same surface as the raised portions 55 on the substrate 30. In a case in which the primer layer 45, which will be described later, is positioned between the substrate 30 and the raised portions 55, the design layer 40 may be positioned between the substrate 30 and the primer layer 45 in the third direction D3. The design layer 40 may be positioned over the entire region of the decorative sheet 20, or may be positioned only in a partial region of the decorative sheet 20.

Examples of the design layer 40 include a colored layer in which a single-color ink is uniformly applied; a motif layer in which ink is printed as a motif; a metal thin-film layer; and so forth. The design layer 40 may include two or more of a colored layer, a motif layer, a metal thin-film layer, and so forth. Examples of motifs (patterns) expressed by the design layer 40 include wood-grain patterns such as growth rings, duct grooves, and so forth, of wood material board surfaces; stone grain patterns of stone plate surfaces of marble, granite, and so forth; cloth patterns of fabric surfaces; leather grain patterns of leather surfaces; tiled patterns including grouting grooves; laid-brick patterns including grouting grooves; sand grain patterns; pear-skin finish patterns; patterns in which a plurality of grooves and ridges are arrayed extending in parallel directions with each other (so-called "single-hatching ridged patterns" or "light engraving patterns"); geometric patterns, letters, shapes, abstract patterns such as polka-dot, floral, and the like; and so forth.

The decorative sheet may include a motif layer (picture layer) as the design layer 40. The motif layer and the raised portions 55 may display wood-grain patterns. According to this example, natural objects can be reproduced with high precision by mutual effects of sight and sense of touch.

The composition used in forming the colored layer and the motif layer may be an ink in which a colorant such as a pigment, a dye, or the like, an extender pigment, a solvent, a stabilizer, a plasticizing agent, a catalyst, a hardener, an ultraviolet light absorbing agent, a light stabilizer, and the like, are mixed into a binder resin as appropriate. The binder resin used for the colored layer and the motif layer is not limited in particular. Examples of the binder resin include resins such as urethane resins, acrylic polyol resins, acrylic resins, ester resins, amide resins, butyral resins, styrene resins, urethane-acrylic copolymers, polyvinyl chloride-vinyl acetate copolymer resins, polyvinyl chloride-vinyl acetate-acrylic copolymer resins, chlorinated propylene resins, nitrocellulose resins, cellulose acetate resins, and so forth. Also, various types of resins, such as single-component-curing resins, two-component curing resins involving curing agents such as isocyanate compounds or the like, and so forth, can be applied as binder resins used for the colored layer and the motif layer.

The colorant is not limited in particular. Examples of colorants include inorganic pigments such as carbon black (soot-based brush-writing ink), iron black, titanium white, antimony white, lead yellow, titanium yellow, red iron oxide, cadmium red, ultramarine, cobalt blue, and so forth; organic pigments or dyes such as quinacridone red, isoindolinone yellow, nickel azo complexes, phthalocyanine blue, azomethine azo black, and so forth; metallic pigments made up of scale-like foil flakes of aluminum, brass, or the like; pearlescent (pearl) pigments or the like made up of scale-like foil flakes of titanium dioxide-coated mica, basic lead carbonate, and so forth.

The content of the colorant is not limited in particular. The content of the colorant may be adjusted in accordance with the motif, the tone and color concentration, the material of the colorant, and so forth, of the ornamental layer. The content of the colorant may be, as one example, 20 parts by mass or more and 500 parts by mass or less as to 100 parts by mass of resin making up the colored layer and the motif layer, may be 50 parts by mass or more and 300 parts by mass or less, or may be 70 parts by mass or more and 200 parts by mass or less, for example.

The colored layer and the motif layer may include additives such as an ultraviolet light absorbing agent, a light stabilizer, a colorant, and so forth. The thickness of the colored layer and the motif layer can be selected as appropriate in accordance with the desired motif. The thickness of the colored layer and the motif layer may be selected from the perspective of hiding ground color of the support member 15 and also improving design quality. The thickness of the colored layer and the motif layer may be 0.5 μm or more and 20 μm or less, may be 1 μm or more and 10 μm or less, or may be 2 μm or more and 5 μm or less.

Examples of metal thin-films include thin-films of single metal elements such as gold, silver, copper tin, iron, nickel, chromium, cobalt, and so forth; thin-films of alloys containing two or more types of the metal elements; and so forth. Examples of alloys include brass, bronze, stainless steel, and so forth. The film thickness of the metal thin-film may be around 0.1 μm to 1 μm.

«Primer Layer»

The decorative sheet 20 may include the primer layer 45 in order to improve adherence. The primer layer 45 may be positioned over the entire region between the substrate 30 and the raised portions 55. As illustrated in FIG. 1, in a case in which the decorative sheet 20 includes the design layer 40, the primer layer 45 may be positioned over the entire region between the design layer 40 and the raised portions 55 in the third direction D3.

The primer layer 45 is primarily made up of a binder resin, and may include additives such as an ultraviolet light absorbing agent, a light stabilizer, and so forth, as necessary. Examples of the binder resin include resins such as urethane resins, acrylic polyol resins, acrylic resins, ester resins, amide resins, butyral resins, styrene resins, urethane-acrylic copolymers, polycarbonate-based urethane-acrylic copolymers (a urethane-acrylic copolymer based on a polymer having a carbonate bond on a polymer main chain and two or more hydroxyl groups on an end or side chain (polycarbonate polyol)), polyvinyl chloride-vinyl acetate copolymer resins, polyvinyl chloride-vinyl acetate-acrylic copolymer resins, chlorinated propylene resins, nitrocellulose resins (guncotton), cellulose acetate resins, and so forth. The binder resin may include these alone, or may include a plurality of types. The binder resin may be obtained by adding a curing agent such as an isocyanate curing agent, an epoxy curing agent, or the like, to these resins, to perform curing by cross-linking. The binder resin may be obtained by performing curing by cross-linking of a polyol resin such as an acrylic polyol resin or the like with an isocyanate curing agent, or may be obtained by performing curing by cross-linking of an acrylic polyol resin with an isocyanate curing agent.

The primer layer 45 may include an ultraviolet light absorbing agent and/or light stabilizer for the purpose of improving weatherproofing. The primer layer 45 may include a general-purpose ultraviolet light absorbing agent and light stabilizer.

The thickness of the primer layer 45 may be 0.01 μm or more and 10 μm or less, may be 0.7 μm or more and 8 μm or less, or may be 1.0 μm or more and 6 μm or less.

«Adhesive Agent Layer»

The decorative sheet 20 and the decorative member 100 may include an adhesive agent layer between the substrate 30 and the support member 15 in the third direction D3.

The adhesive agent used for the adhesive agent layer is not limited in particular. The adhesive agent used for the adhesive agent layer may be a known adhesive agent. The adhesive agent used for the adhesive agent layer may be an adhesive agent such as a heat-sensitive adhesive agent, a pressure-sensitive adhesive agent, or the like. Resins used for the adhesive agent may be acrylic resins, urethane resins, polyvinyl chloride resins, vinyl acetate resins, polyvinyl chloride-vinyl acetate copolymer resins, styrene-acrylic copolymer resins, polyester resins, polyamide resins, and so forth. The resin used for the adhesive agent may include these alone, or may include a plurality of types. The resin used for the adhesive agent may be a two-component curing type polyurethane-based resin in which an isocyanate compound is the curing agent, or the like, or a polyester-based adhesive agent. A pressure sensitive adhesive may be used as the adhesive agent layer. Pressure sensitive adhesives such as those that are acrylic-based, urethan-based, silicon-based, rubber-based, and so forth, can be selected as appropriate as the pressure sensitive adhesive.

The adhesive agent layer can be fabricated by performing coating using means such as gravure printing, screen printing, reverse coating using a gravure plate, or like techniques, of a coatable form of the above resins, such as a solution, an emulsion, or the like, and then performing drying thereof. The thickness of the adhesive agent layer is not limited in particular. From a perspective of obtaining excellent adhesivity, the thickness of the adhesive agent layer may be 1 μm or more and 100 μm or less, may be 5 μm or more and 50 μm or less, or may be 10 μm or more and 30 μm or less.

<Surface Features>

As described above, the maximum height Rz, skewness Ssk, and kurtosis Sku at the surface 20A of the decorative sheet 20 made up of the surface protective layer 60 can be adjusted as follows.

Maximum height RzA at first region 61: 25 μm or more
Maximum height RzB at second region 62: 18 μm or more
Skewness SskA at first region 61: greater than 0
Skewness SskB at second region 62: greater than 0
Kurtosis SkuA at first region 61: 10.0 or more
Kurtosis SkuB at second region 62: 4.0 or more Through diligent study, the present inventors found that by including the surface 20A having the above surface properties, the decorative sheet 20 has uneven surfaces including high, fine, and sharp ridge portions on both of the first regions 61 and the second regions 62. Accordingly, a strong tactile sensation is imparted from the entire region of the surface protective layer 60. In addition, the first regions 61 have a greater maximum height Rz and a greater kurtosis Sku in comparison with the second regions 62. Thus, the first regions 61 have higher and sharper ridge portions or protruding portions in comparison with the second regions 62, and a stronger tactile sensation is imparted. Moreover, the first regions 61 are perceived by tactile sensation to be more elevated than the second regions 62 due to the raised portions 55. According to the combination of the first regions 61 and the second regions 62, a complex and strong tactile sensation can be imparted to the user touching the decorative sheet 20. That is to say, various types of tactile sensations can be imparted with emphasis. The decorative sheet 20 can impart tactile sensation reproducing tactile sensation of natural objects with high precision, through rich tactile sensation expressions. Artificial impressions of the decorative sheet 20 can be subdued, and Natural features can be created in the decorative sheet 20.

The surface 20A having such surface properties can be imparted by the decorative sheet 20 of the configuration described above, as one example. In this decorative sheet 20, the surface protective layer 60 includes the second binder resin 66 and the second particles 67. The second average thickness TB (μm) that is the average thickness of the surface protective layer 60 is smaller than the second average particle size DB (μm) that is the average particle size of the second particles 67. The first average thickness TA that is the average thickness of the raised portions 55 is larger than the second average particle size DB (μm).

In this decorative sheet, the raised portions 55 may include the first binder resin 56 and the first particles 57. The first average particle size DA that is the average particle size of the first particles 57 may be 0.7 times or more and 1.3 times or less the first average thickness TA of the raised portions 55. According to this configuration, the raised portions 55 have uneven surfaces due to the raised portions 55 including the first binder resin 56 and the first particles 57. In the first regions 61, the surface protective layer 60 is situated above the raised portions 55 that are uneven surfaces. Accordingly, the first regions 61 can be imparted with a stronger uneven surface than the second regions 62. In particular, by making the first average particle size DA that is the average particle size of the first particles 57 to be 0.7 times or more and 1.3 times or less the first average thickness TA of the raised portions 55, the first regions 61 include ridges that are appropriately higher and appropriately sharper as compared with the second regions 62. That is to say, the first regions 61 can have a greater maximum height Rz and a greater kurtosis Sku, as compared with the second regions 62.

In this decorative sheet 20, the maximum height Rz of the surface protective layer 60 that is stipulated in JIS B0601: 2013 may be made to be greater in the first regions 61 than in the second regions 62. A stronger tactile sensation is imparted in the first regions 61 than in the second regions 62. Further, the first regions 61 are elevated as compared to the second regions 62. According to these, the difference between the tactile sensation obtained from the first regions 61 and the tactile sensation obtained from the second regions 62 is perceived more clearly.

Also, the above-described surface properties can be realized by the decorative sheet 20 having the following configuration as well. In this decorative sheet 20, the raised portions 55 include the first binder resin 56 and the first particles 57 of which the average particle size DA is 10 μm or more. The surface protective layer 60 includes the second binder resin 66 and the second particles 67 of which the average particle size is 10 μm or more and 20 μm or less. The first average thickness TA of the raised portions 55 is 20 μm or more. The second average thickness TB of the surface protective layer 60 is 3 μm or more and 15 μm or less.

In the following, the maximum height Rz, the skewness Ssk, and the kurtosis Sku on the surface 20A of the decorative sheet 20 will be described in order.

<Maximum Height Rz>

The maximum height Rz is the maximum height of an outline curve, stipulated in JIS B0601:2013. The maximum height RzA is a measurement value at the surface 20A that is the first regions 61. The maximum height RzB is a measurement value at the surface 20A that is the second regions 62. In measurement of the maximum height Rz as referred to in the present specification, a cutoff value is 0.8 mm.

The maximum height RzA of the surface 20A in the first regions 61 facing the raised portions 55 may be 25 μm or more. By making the maximum height RzA to be 25 μm or more, the first regions 61 can impart a stronger tactile sensation to the user touching the decorative sheet 20. The maximum height RzA in the first regions 61 may be 30 μm or more, may be 35 μm or more, or may be 40 μm or more. According to these examples, the tactile sensation obtained from the first regions 61 can be emphasized more.

An upper limit may be provided for the maximum height RzA in the first regions 61. Providing an upper limit to the maximum height RzA enables drastically large ridge portions or protruding portions to be suppressed from being formed. Accordingly, unnatural tactile sensation can be suppressed, and tactile sensation of natural objects can be reproduced. Hence, the maximum height RzA in the first regions may be 60 μm or less, may be 55 μm or less, or may be 50 μm or less.

The maximum height RzB of the surface 20A in the second regions 62 not facing the raised portions 55 may be 18 μm or more. By making the maximum height RzB to be 18 μm or more, the second regions 62 can impart a stronger tactile sensation to the user touching the decorative sheet 20. The maximum height RzB in the second regions 62 may be 19 μm or more, or may be 20 μm or more. According to these examples, the tactile sensation obtained from the second regions 62 can be emphasized more.

An upper limit may be provided for the maximum height RzB in the second regions 62. Providing an upper limit to the maximum height RzB enables difference between the maximum height RzA in the first regions 61 and the maximum height RzB in the second regions 62 to be sufficiently secured. Accordingly, the difference in the tactile sensation obtained from the first regions 61 and the tactile sensation obtained from the second regions 62 can be sufficiently perceived. Hence, the maximum height RzB in the second regions 62 may be 29 μm or less, may be 26 μm or less, or may be 24 μm or less.

The maximum height RzB at the second regions 62 may be smaller than the maximum height RzA at the first regions 61. That is to say, "RzB<RzA" may hold. Due to satisfying this relation, the difference in the tactile sensation obtained from the first regions 61 and the tactile sensation obtained from the second regions 62 becomes great. Accordingly, the decorative sheet 20 can reproduce tactile sensation obtained when touching natural objects, with higher precision. In anticipation of such advantageous effects, the value of "RzA minus RzB" may be 2 μm or more, may be 4 μm or more, or may be 6 μm or more.

Providing an upper limit to the value of "RzA minus RzB" enables the difference between the tactile sensation obtained from the first regions 61 and the tactile sensation obtained from the second regions 62 to be appropriate. Thus, unnatural tactile sensation can be suppressed, and the tactile sensation of natural objects can be reproduced. From this perspective, "RzA minus RzB" may be 20 μm or less, may be 15 μm or less, or may be 10 μm or less.

<Skewness Ssk>

The skewness Ssk is stipulated in ISO25178-2:2012. The skewness SskA is the measurement value of the surface 20A that is the first regions 61. The skewness SskB is the measurement value of the surface 20A that is the second regions 62. The skewness SskA in the first regions 61 may be greater than 0. The skewness SskB in the second regions 62 may be greater than 0.

The skewness Ssk is one of three-dimensional surface texture parameters stipulated by the ISO. The skewness Ssk is an index indicating the degree of bias in height distribution from an average plane. In a case in which the skewness Ssk is 0, the surface features are symmetrical with respect to the average height plane. The skewness Ssk is 0 with respect to surface features following a normal distribution. When the skewness Ssk is greater than 0, the surface features are biased to the lower side with respect to the average height plane. That is to say, in a case in which the vicinities of the apices of ridge portions or protruding portions are sharp and narrow, the skewness Ssk is greater than 0. In other words, in a case in which the vicinities of opening portions of valley portions or recessed portions open broadly, the skewness Ssk is greater than 0. When the skewness Ssk is smaller than 0, the surface features are biased to the upper side with respect to the average height plane. That is to say, in a case in which the vicinities of the apices of ridge portions or protruding portions are broad, the skewness Ssk is smaller than 0. In other words, in a case in which the vicinities of opening portions of valley portions or recessed portions open narrowly, the skewness Ssk is smaller than 0.

The tactile sensation can be made stronger by the skewness SskA in the first regions 61 being greater than 0. The skewness SskA in the first regions 61 may be 0.5 or more, may be 1.0 or more, or may be 2.0 or more. The upper limit of the skewness SskA in the first regions 61 is not limited in particular. From the perspective of strength, the skewness SskA in the first regions 61 may be 4.0 or less, or may be 3.0 or less.

The tactile sensation can be made stronger by the skewness SskB in the second regions 62 being greater than 0. The skewness SskB in the second regions 62 may be 0.2 or more, may be 0.5 or more, or may be 0.8 or more. The upper limit of the skewness SskB in the second regions 62 is not limited in particular. From the perspective of strength, the skewness SskB in the second regions 62 may be 3.0 or less, or may be 2.0 or less.

<Kurtosis Sku>

The kurtosis Sku is stipulated in ISO25178-2:2012. The kurtosis SkuA is the measurement value of the surface 20A that is the first regions 61. The kurtosis SkuB is the measurement value of the surface 20A that is the second regions 62. The kurtosis SkuA in the first regions 61 may be 10.0 or more. The kurtosis SkuB in the second regions 62 may be 4.0 or more.

The kurtosis Sku is one of three-dimensional surface texture parameters stipulated by the ISO. The kurtosis Sku is an index indicating the degree of peakedness of the height distribution from the average plane. In a case in which the kurtosis Sku is 3, the height distribution has a profile of a normal distribution. When the kurtosis Sku is greater than 3, the height distribution has a profile of a peaked form. When the kurtosis Sku is smaller than 3, the height distribution has a compressed form.

The tactile sensation can be made stronger by the kurtosis SkuA in the first regions 61 being 10.0 or more. The kurtosis SkuA in the first regions 61 may be 12.0 or more, or may be 14.0 or more. The upper limit of the kurtosis SkuA is not limited in particular. The kurtosis SkuA may be 20.0 or less, or more preferably may be 18.0 or less.

The tactile sensation can be made stronger by the kurtosis SkuB in the second regions 62 being 4.0 or more. The kurtosis SkuB in the second regions 62 may be 4.6 or more, may be 4.7 or more, or may be 4.9 or more. The upper limit of the kurtosis SkuB in the second regions 62 is not limited in particular. The kurtosis SkuB in the second regions 62 may be 10.0 or less, may be 8.0 or less, or may be 6.5 or less.

The maximum height Rz, the skewness Ssk, and the kurtosis Sku can be adjusted by the first average thickness TA that is the average thickness of the raised portions 55, the second average thickness TB that is the average thickness of the surface protective layer 60, the first average particle size DA that is the average particle size of the first particles 57, the second average particle size DB that is the average particle size of the second particles 67, the content of the first particles 57 in the raised portions 55, and the content of the second particles 67 in the surface protective layer 60, and so forth, as described above. In order to adjust the maximum height RzA, the maximum height RzB, the skewness SskA, the skewness SskB, the kurtosis SkuA, and the kurtosis SkuB to the above-described ranges, setting the above-described first average thickness TA, first average particle size DA, second average thickness TB, and second average particle size DB, so as to be in the above-described numerical value ranges is effective.

In the present specification, the maximum height RzA, the maximum height RzB, the skewness SskA, the skewness SskB, the kurtosis SkuA, and the kurtosis SkuB, are each an average value of measurement values at 20 positions.

The maximum height Rz, the skewness Ssk, and the kurtosis Sku can be measured using a shape analyzing laser microscope with respect to a rectangular region of a random position of surface features of the decorative sheet 20. The size of the rectangular region may be around 1402 μm×1051 μm. Surface features in regions of 20 random positions are measured, and the maximum height RzA, the maximum height RzB, the skewness SskA, the skewness SskB, the kurtosis SkuA, and the kurtosis SkuB, can be identified as average values of 20 positions. The measurement conditions can be adjusted as appropriate, and for example, measurement can be performed in accordance with conditions described in the Examples.

<Usages>

The decorative member 100 and the decorative sheet 20 according to the present disclosure can be used in a variety of usages. Examples of specific usages include the following (1) to (9).

(1) Surface materials for interior material portions, such as walls, floors, ceilings, and so forth, of buildings such as homes, offices, shops, hospitals, clinics, and so forth.

(2) Surface materials for exterior portions, such as outer walls, roofs, eaves ceilings, shutter boxes, and so forth, of buildings such as homes, offices, shops, hospitals, clinics, and so forth.

(3) Surface materials (interior material portions or exterior material portions) of fittings, such as windows, window frames, doors, door frames, and so forth; surface materials of equipment associated with fittings (handles, etc.); surface materials of fixtures of fittings.

(4) Surface materials of carpentry members such as handrails, partly-covered walls, encircling hallways, thresholds, lintels, and copings.

(5) Surface materials of outdoor (exterior) portions, such as walls, gates, posts for clotheslines, handrails, and so forth.

(6) Surface materials of furniture, such as drawers, desks, chairs, cupboards, kitchen sink countertops, and so forth; surface materials of equipment associated with furniture (handles, etc.); surface materials of fixtures of furniture.

(7) Surface materials of housings and the like of various types of home electronic appliances, such as television receivers, radio receivers, refrigerators, microwave ovens, washing machines, fans, air conditioners, and so forth; surface materials of equipment associated with home electronic appliances (handles, switches, touch panels, etc.); surface materials of fixtures of home electronic appliances.

(8) Surface materials of office automation equipment such as electronic photocopiers, facsimile machines, printers, various types of computer equipment such as personal computers and the like, and so forth; surface materials of housings of various types of office automation equipment such as ATM devices in financial institutions such as banks, postal savings systems, and so forth; surface materials of equipment associated with various types of office automation equipment (keyboard keys, touch panels, etc.); surface materials of fixtures of various types of office automation equipment.

(9) Surface materials of interior material portions or exterior material portions (walls, floors, ceilings, handrails, posts, operation panels, levers, handles, operating equipment such as steering wheels and so forth) of vehicles such as wheeled vehicles like automobiles and train cars, ships, aircrafts, and so forth.

An embodiment of the present disclosure relates to the following [1] to [20].

[1] A decorative sheet, including
 a substrate,
 a surface protective layer that is situated over the substrate and that includes a first region and a second region, and
 a raised portion that is situated between the substrate and the first region of the surface protective layer, wherein
 a maximum height Rz stipulated in JIS B0601:2013 is 25 μm or more in the first region of the surface protective layer, and is 18 μm or more in the second region of the surface protective layer,
 a skewness Ssk stipulated in ISO25178-2:2012 is greater than 0 in the first region of the surface protective layer, and is greater than 0 in the second region of the surface protective layer, and
 a kurtosis Sku stipulated in ISO25178-2:2012 is 10.0 or more in the first region of the surface protective layer and is 4.0 or more in the second region of the surface protective layer.

[2] The decorative sheet according to [1], wherein
 the raised portion includes a first binder resin and a first particle, and
 the surface protective layer includes a second binder resin and a second particle.

[3] The decorative sheet according to [2], wherein
 an average thickness of the surface protective layer is smaller than an average particle size of the second particle, and
 an average thickness of the raised portion is greater than the average particle size of the second particle.

[4]
 A decorative sheet, including
  a substrate,
  a surface protective layer that is situated over the substrate and that includes a first region and a second region, and
  a raised portion that is situated between the substrate and the first region of the surface protective layer, wherein
  the surface protective layer includes a second binder resin and a second particle,
  an average thickness of the surface protective layer is smaller than an average particle size of the second particle, and
  an average thickness of the raised portion is larger than the average particle size of the second particle.

[5] The decorative sheet according to [3] or [4], wherein
 the raised portion includes a first binder resin and a first particle, and
 an average particle size of the first particle is 0.7 times or more and 1.3 times or less the average thickness of the raised portion.

[6] The decorative sheet according to [4] or [5], wherein
 a maximum height Rz of the surface protective layer stipulated in JIS B0601:2013 is 18 μm or more.

[7] The decorative sheet according to any one of [4] to [6], wherein the maximum height Rz of the surface protective layer stipulated in JIS B0601:2013 is greater in the first region than in the second region.

[8] A decorative sheet, including a substrate, a surface protective layer that is situated over the substrate and that includes a first region and a second region, and a raised portion that is situated between the substrate and the first region of the surface protective layer, wherein the raised portion includes a first binder resin and a first particle of which an average particle size is 10 μm or more, the surface protective layer includes a second binder resin and a second particle of which an average particle size is 10 μm or more and 20 μm or less, an average thickness of the raised portion is 20 μm or more, and an average thickness of the surface protective layer is 3 μm or more and 15 μm or less.

[9] The decorative sheet according to any one of [2] to [8], wherein the average particle size of the first particle is 10 μm or more and 50 μm or less.

[10] The decorative sheet according to any one of [2] to [9], wherein the average thickness of the raised portion is 20 μm or more and 60 μm or less.

[11] The decorative sheet according to any one of [2] to [10], wherein the average particle size of the second particle is smaller than the average particle size of the first particle.

[12] The decorative sheet according to any one of [4] to [11], wherein a maximum height Rz stipulated in JIS B0601:2013 is 25 μm or more in the first region.

[13] The decorative sheet according to any one of [4] to [12], wherein the maximum height Rz stipulated in JIS B0601:2013 is 18 μm or more in the second region.

[14] The decorative sheet according to any one of [4] to [13], wherein a skewness Ssk stipulated in ISO25178-2:2012 is greater than 0 in the first region.

[15] The decorative sheet according to any one of [4] to [14], wherein the skewness Ssk stipulated in ISO25178-2:2012 is greater than 0 in the second region.

[16] The decorative sheet according to any one of [4] to [15], wherein a kurtosis Sku stipulated in ISO25178-2:2012 is 10.0 or more in the first region.

[17] The decorative sheet according to any one of [4] to [15], wherein a kurtosis Sku stipulated in ISO25178-2:2012 is 4.0 or more in the second region.

[18] The decorative sheet according to any one of [4] to [17], further including a design layer that is situated between the substrate and the surface protective layer.

[19] The decorative sheet according to [18], wherein the design layer displays a wood-grain pattern.

[20] A decorative member, including the decorative sheet according to any one of [1] to [19], and a support member that supports the decorative sheet.

EXAMPLES

The present disclosure will be described in further detail by way of Examples. The present disclosure is not limited to the following Examples.

1. Measurement and Evaluation

Measurement and evaluation of decorative sheets according to Examples and Comparative Examples were performed as described below. Note that the atmosphere at the time of measurement and evaluation was temperature of 23±5° C., and relative humidity of 40% or more and 65% or less. Also, prior to starting each measurement and evaluation, the object samples were exposed to this atmosphere for 30 minutes or more before performing measurement and evaluation. The results are shown in Table 1.

1-1. Tactile Sensation 20 subjects evaluated tactile sensation of the decorative sheets obtained by the Examples and Comparative Examples. Five each of the 20 subjects were in their twenties, thirties, forties, and fifties. Each subject felt the surfaces of the decorative sheets with the ball of their index finger of their dominant hand, and evaluated whether or not the tactile sensation was excellent. The evaluation standard for tactile sensation was "is unevenness strongly felt or not" and "is the tactile sensation different between the first regions and the second regions, and does it feel natural or not". Table 1 shows the results of classifying the collected evaluations of tactile sensation in accordance with the following standards. Strong tactile sensation was obtained from the decorative sheets according to Examples 1 to 5. With regard to the decorative sheets according to Examples 1 to 4 in particular, the tactile sensation obtained from the first regions facing the raised portions could be perceived as being more emphasized than the tactile sensation obtained from the second regions not facing the raised portions.

A: 18 or more out of 20 answered that the tactile sensation was excellent.

B: 15 or more and 17 or less out of 20 answered that the tactile sensation was excellent.

C: 11 or more and 14 or less out of 20 answered that the tactile sensation was excellent.

D: 10 or less out of 20 answered that the tactile sensation was excellent.

1-2. Low Gloss 20 subjects evaluated gloss of the decorative sheets obtained by the Examples and Comparative Examples. Five each of the 20 subjects were in their twenties, thirties, forties, and fifties. Each subject visually observed the surfaces of the decorative sheets, and evaluated whether or not gloss was sufficiently subdued. Evaluation was performed under fluorescent lighting indoors, with external light blocked. Table 1 shows the results of classifying the collected evaluations of gloss in accordance with the following standards.

A: 18 or more out of 20 answered that the gloss was low.

B: 15 or more and 17 or less out of 20 answered that the gloss was low.

C: 11 or more and 14 or less out of 20 answered that the gloss was low.

D: 10 or less out of 20 answered that the gloss was low.

1-3. Surface Features

Measurement was performed regarding the surface features of the first regions over the raised portions and the second regions not facing the raised portions, with respect to the decorative sheets obtained by the Examples and Comparative Examples. The measurement items were "maximum height (Rz) of outline curves, stipulated in JIS B0601: 2013", "skewness Ssk stipulated in ISO25178-2:2012", and "kurtosis Sku stipulated in ISO25178-2:2012".

The measurement device was a shape analyzing laser microscope ("VK-X1000 (control unit)/VK-X1050 (measurement unit)", manufactured by Keyence Corporation). The measurement conditions were as described below. The cutoff value at the time of calculating the maximum height Rz was 0.8 mm. The measurement region for performing measurement one time was 1402 μm×1051 μm. Measurement was performed 20 times, and the average values of the 20 measurement values from performing measurement 20 times were taken as the values of RzA, RzB, SskA, SskB, SkuA, and SkuB in each of the Examples and Comparative Examples.

<Measurement Conditions>

Objective lens: 10×, laser wavelength: 661 nm, measurement mode: surface features mode, measurement pitch: 1.6 μm, measurement quality: high-speed mode 2. Fabrication of Decorative Member

Example 1

Building-material-grade colored base paper ("CHPS45 (model number)", grammage: 45 g/m², manufactured by TENTOK PAPER CO., LTD) was used as the substrate. A face of the substrate was subjected to processing to facilitate adhesion, when was then coated with a resin composition by gravure printing, thereby forming a colored layer 5 μm thick. The resin composition included a mixed resin of acrylic resin and urethane resin as a binder, and also included titanium white, red iron oxide, and lead yellow, as colorants. Next, a motif layer of a wood-grain pattern was formed on the colored layer with guncotton as a binder, using a resin composition including a colorant of which the primary component was red iron oxide. The wood-grain pattern was a pattern of duct grooves. A design layer was formed on the substrate by the colored layer and the motif layer.

Next, the entire surface of the design layer was coated with a primer-layer composition and dried, thereby forming a primer layer 5 μm thick. The primer-layer composition included a two-component-curing resin (primary agent: acrylic polyol, curing agent; hexamethylene diisocyanate).

Next, a partial region on the primer layer was coated with a raised-portion composition 1 of the following formula by gravure printing, and dried, thereby forming raised portions. The portions where the raised portions were formed were made to approximately match the portions where the motif layer was formed. The wood-grain pattern was formed by the motif layer and the raised portions. The raised portions included a first binder resin, and second particles of which the first average particle size DA was 30 μm. The first average thickness TA of the raised portions was 30 μm.

Next, coating was performed with a surface-protective-layer composition 1 of the following formula by roll coating, so as to cover the entirety of regions in which the raised portions were laid out and regions in which the raised portions were not laid out, and irradiated by electron beam (applied voltage: 175 KeV, 5 Mrad (50 kGy)). The uncured resin layer was cured by the irradiation by the electron beam, thereby forming the surface protective layer. Heat curing was then performed for 24 hours at 70° C., thereby yielding the decorative sheet according to Example 1. The surface protective layer included a second binder resin, and second particles of which the second average particle size DB was 15 μm. The second average thickness TB of the surface protective layer was 8 μm.

<Raised-Portion Composition 1>

Two-component-curing resin: 100 parts by mass
(primary agent: acrylic polyol, curing agent; hexamethylene diisocyanate)
Resin particles: 25 parts by mass
(spherical polymethyl methacrylate particles)
Solvent: Adequate amount <Surface-Protective-Layer Composition 1>

Electron-beam-curing polyfunctional acrylate resin: 100 parts by mass
Inorganic particles: 25 parts by mass
(spherical silica particles)

Example 2

A decorative sheet according to Example 2 was fabricated in the same way as with Example 1. However, the usage amount of the surface-protective-layer composition 1 was changed from that in Example 1, and the decorative sheet according to Example 2 was fabricated.

In the decorative sheet according to Example 2, the first average thickness TA of the raised portions was 30 μm, and the first average particle size DA of the first particles was 30 μm. In the decorative sheet according to Example 2, the second average thickness TB of the surface protective layer was 7 μm, and the second average particle size DB of the second particles was 15 μm.

Example 3

A decorative sheet according to Example 3 was fabricated in the same way as with Example 1. However, the usage amount of the surface-protective-layer composition 1, and the particle size of the second particles included in the surface-protective-layer composition 1, were changed from that in Example 1, and the decorative sheet according to Example 3 was fabricated.

In the decorative sheet according to Example 3, the first average thickness TA of the raised portions was 30 μm, and the first average particle size DA of the first particles was 30 μm. In the decorative sheet according to Example 3, the second average thickness TB of the surface protective layer was 7 μm, and the second average particle size DB of the second particles was 12 μm.

Example 4

A decorative sheet according to Example 4 was fabricated in the same way as with Example 1. However, the usage amount of the surface-protective-layer composition 1 was changed from that in Example 1, and the decorative sheet according to Example 4 was fabricated.

In the decorative sheet according to Example 4, the first average thickness TA of the raised portions was 30 μm, and the first average particle size DA of the first particles was 30 μm. In the decorative sheet according to Example 4, the second average thickness TB of the surface protective layer was 10 μm, and the second average particle size DB of the second particles was 15 μm.

Example 5

A decorative sheet according to Example 5 was fabricated in the same way as with Example 1. However, the usage amount of the surface-protective-layer composition 1, and the particle size of the second particles included in the surface-protective-layer composition 1, were changed from that in Example 1, and the decorative sheet according to Example 5 was fabricated.

In the decorative sheet according to Example 5, the first average thickness TA of the raised portions was 30 μm, and the first average particle size DA of the first particles was 30 μm. In the decorative sheet according to Example 5, the second average thickness TB of the surface protective layer was 4 μm, and the second average particle size DB of the second particles was 12 μm.

Comparative Example 1

A decorative sheet according to Comparative Example 1 was fabricated in the same way as with Example 1. However, the usage amount of the raised-portion composition 1, the first particles included in the raised-portion composition 1, the usage amount of the surface-protective-layer composition 1, and the second particles included in the surface-protective-layer composition 1, were changed from that in Example 1, and the decorative sheet according to Comparative Example 1 was fabricated.

In the decorative sheet according to Comparative Example 1, the first average thickness TA of the raised portions was 10 μm, and the first average particle size DA of the first particles was 12 μm. In the decorative sheet according to Comparative Example 1, the second average thickness TB of the surface protective layer was 4 μm, and the second average particle size DB of the second particles was 5 μm.

Comparative Example 2

A decorative sheet according to Comparative Example 2 was fabricated in the same way as with Example 1. However, the usage amount of the surface-protective-layer composition 1, and the second particles included in the surface-protective-layer composition 1, were changed from that in Example 1, and the decorative sheet according to Comparative Example 2 was fabricated.

In the decorative sheet according to Comparative Example 2, the first average thickness TA of the raised portions was 30 μm, and the first average particle size DA of the first particles was 30 μm. In the decorative sheet according to Comparative Example 2, the second average thickness TB of the surface protective layer was 4 μm, and the second average particle size DB of the second particles was 5 μm.

The invention claimed is:

1. A decorative sheet, comprising:
a substrate;
a surface protective layer that is situated over the substrate and that includes a first region and a second region; and
a raised portion that is situated between the substrate and the first region of the surface protective layer, wherein
a maximum height Rz stipulated in JIS B0601:2013 is 25 μm or more in the first region of the surface protective layer, and is 18 μm or more in the second region of the surface protective layer,
a skewness Ssk stipulated in ISO25178-2:2012 is greater than 0 in the first region of the surface protective layer, and is greater than 0 in the second region of the surface protective layer, and
a kurtosis Sku stipulated in ISO25178-2:2012 is 10.0 or more in the first region of the surface protective layer and is 4.0 or more in the second region of the surface protective layer.

2. The decorative sheet according to claim 1, wherein
the raised portion includes a first binder resin and a first particle, and
the surface protective layer includes a second binder resin and a second particle.

3. The decorative sheet according to claim 2, wherein
an average thickness of the surface protective layer is smaller than an average particle size of the second particle, and
an average thickness of the raised portion is greater than the average particle size of the second particle.

4. A decorative sheet, comprising:
a substrate;
a surface protective layer that is situated over the substrate and that includes a first region and a second region; and

TABLE 1

Table 1 Makeup of samples, surface features, and evaluation results

|  |  | Example 1 | Example 2 | Example 3 | Example 4 | Example 5 | Comparative Example 1 | Comparative Example 2 |
|---|---|---|---|---|---|---|---|---|
| Raised portions | First average particle size DA (μm) | 30 | 30 | 30 | 30 | 30 | 12 | 30 |
|  | First average thickness TA (μm) | 30 | 30 | 30 | 30 | 30 | 10 | 30 |
| Surface protective layer | Second average particle size DB (μm) | 15 | 15 | 12 | 15 | 12 | 5 | 5 |
|  | Second average thickness TB (μm) | 8 | 7 | 7 | 10 | 4 | 4 | 4 |
| Surface features | Maximum height RzA (μm) | 30 | 30 | 30 | 30 | 30 | 18 | 30 |
|  | Maximum height RzB (μm) | 22 | 22 | 18 | 22 | 32 | 12 | 12 |
|  | Skewness SskA | 2.0 | 2.0 | 2.0 | 2.0 | 2.0 | 0.7 | 2.0 |
|  | Skewness SskB | 1.0 | 1.4 | 0.2 | 1.0 | 2.7 | −0.3 | −0.3 |
|  | Kurtosis SkuA | 16.0 | 16.0 | 16.0 | 16.0 | 16.0 | 3.2 | 16.0 |
|  | Kurtosis SkuB | 5.0 | 9.0 | 4.2 | 5.0 | 11.8 | 4.0 | 4.0 |
| Evaluation | Tactile sensation | A | A | A | A | B | D | C |
|  | Gloss Suppression | A | A | A | A | A | A | A |

REFERENCE SIGNS LIST

100 decorative member, 20 decorative sheet, 20A surface, 30 substrate, 40 design layer, 45 primer layer, 50 raised layer, 55 raised portion, 56 first binder resin, 57 first particles, 60 surface protective layer, 61 first region, 62 second region, 66 second binder resin, 67 second particles, D1: first direction D1, D2 second direction D1, D3 third direction D1 a raised portion that is situated between the substrate and the first region of the surface protective layer, wherein
the surface protective layer includes a binder resin and a particle in both the first region and the second region,
an average thickness of the surface protective layer is smaller than an average particle size of the particle, and
an average thickness of the raised portion is larger than the average particle size of the particle.

5. The decorative sheet according to claim 3, wherein the raised portion includes a first binder resin and a first particle, and an average particle size of the first particle is 0.7 times or more and 1.3 times or less the average thickness of the raised portion.

6. The decorative sheet according to claim 4, wherein a maximum height Rz of the surface protective layer stipulated in JIS B0601: 2013 is 18 μm or more.

7. The decorative sheet according to claim 4, wherein the maximum height Rz of the surface protective layer stipulated in JIS B0601: 2013 is greater in the first region than in the second region.

8. A decorative sheet, comprising:

a substrate;

a surface protective layer that is situated over the substrate and that includes a first region and a second region; and a raised portion that is situated between the substrate and the first region of the surface protective layer, wherein the raised portion includes a first binder resin and a first particle of which an average particle size is 10 μm or more, the surface protective layer includes a second binder resin and a second particle of which an average particle size is 10 μm or more and 20 μm or less, an average thickness of the raised portion is 20 μm or more, and an average thickness of the surface protective layer is 3 μm or more and 15 μm or less.

9. The decorative sheet according to claim 2, wherein the average particle size of the first particle is 10 μm or more and 50 μm or less.

10. The decorative sheet according to claim 2, wherein the average thickness of the raised portion is 20 μm or more and 60 μm or less.

11. The decorative sheet according to claim 2, wherein the average particle size of the second particle is smaller than the average particle size of the first particle.

12. The decorative sheet according to claim 8, wherein a maximum height Rz stipulated in JIS B0601: 2013 is 25 μm or more in the first region.

13. The decorative sheet according to claim 8, wherein the maximum height Rz stipulated in JIS B0601: 2013 is 18 μm or more in the second region.

14. The decorative sheet according to claim 8, wherein a skewness Ssk stipulated in ISO25178-2:2012 is greater than 0 in the first region.

15. The decorative sheet according to claim 8, wherein the skewness Ssk stipulated in ISO25178-2:2012 is greater than 0 in the second region.

16. The decorative sheet according to claim 8, wherein a kurtosis Sku stipulated in ISO25178-2:2012 is 10.0 or more in the first region.

17. The decorative sheet according to claim 8, wherein a kurtosis Sku stipulated in ISO25178-2:2012 is 4.0 or more in the second region.

18. The decorative sheet according to claim 1, further comprising:

a design layer that is situated between the substrate and the surface protective layer.

19. The decorative sheet according to claim 18, wherein the design layer displays a wood-grain pattern.

20. A decorative member, comprising:

the decorative sheet according to claim 1; and a support member that supports the decorative sheet.

\* \* \* \* \*